United States Patent [19]

Coltrinari

[11] Patent Number: 4,708,804
[45] Date of Patent: Nov. 24, 1987

[54] METHOD FOR RECOVERY OF CYANIDE FROM WASTE STREAMS

[75] Inventor: Enzo L. Coltrinari, Golden, Colo.

[73] Assignee: Resource Technology Associates, Boulder, Colo.

[21] Appl. No.: 750,419

[22] Filed: Jun. 28, 1985

[51] Int. Cl.⁴ .................................................. C02F 1/42
[52] U.S. Cl. .................................... 210/677; 210/684; 423/371; 521/26
[58] Field of Search .................. 210/670, 684, 677; 423/24, 100, 139, 364, 367, DIG. 14, 236, 371, 372; 521/26

[56] References Cited

U.S. PATENT DOCUMENTS

| | | | |
|---|---|---|---|
| 2,507,992 | 5/1950 | Payne et al. | 127/46 |
| 2,900,227 | 8/1959 | Dancy et al. | 23/14.5 |
| 3,357,900 | 12/1967 | Snell | 203/47 |
| 3,391,078 | 7/1968 | Odland | 210/670 |
| 3,788,983 | 1/1974 | Fries | 210/684 |
| 3,869,383 | 3/1975 | Shimamura et al. | 210/684 |
| 3,909,403 | 9/1975 | Abe et al. | 210/684 |
| 3,984,314 | 10/1976 | Fries | 423/24 |
| 4,115,260 | 9/1978 | Avery | 210/684 |
| 4,267,159 | 5/1981 | Crits | 423/367 |
| 4,299,922 | 11/1981 | Holl et al. | 521/26 |
| 4,321,145 | 3/1982 | Carlson | 210/678 |
| 4,543,169 | 9/1985 | D'Agostino et al. | 423/24 |

OTHER PUBLICATIONS

Scott, J. S. et al., "Removal of Cyanide from Gold Mill Effluents", 13th Annual Meeting of Canadian Mineral Processors, Ottawa, Ontario, Jan. 20-22, 1981, paper No. 21, pp. 380-416.

J. C. Ingles and J. S. Scott, "Overview of Cyanide Treatment Methods" presented at The Cyanide Gold Mining Seminar, Ottawa, Ontario, Canada 1/22/81.

Primary Examiner—Ivars Cintins
Attorney, Agent, or Firm—Sheridan, Ross & McIntosh

[57] ABSTRACT

A process is provided for removing cyanide from a dilute cyanide solution. The solution is passed through a weak base anion exchange resin to absorb cyanide complexes. The resin is eluted with a weakly basic $Ca(OH)_2$ solution, to produce a cyanide-rich eluate. Elution is accomplished by recycling the eluting fluid past a bed of solid $Ca(OH)_2$, to maintain the eluting fluid in $Ca(OH)_2$ saturation. Recycling in this manner produces an eluate with relatively high cyanide concentration using economical reagents. The eluate is subjected to an acidification/volatilization process including acidification, preferably with $H_2SO_4$, heating by introduction of steam and removal of volatilized HCN by an air sparge. The HCN-rich off-gas and slats produced therefrom may be recycled in the process. The cyanide-depleted waste streams may be disposed of in, for example, tailings ponds.

26 Claims, 2 Drawing Figures

METHOD FOR RECOVERY OF CYANIDE FROM WASTE STREAMS

FIELD OF THE INVENTION

This invention relates to methods of recovering cyanide from solutions, such as waste waters, which contain cyanide compounds and, in particular, to methods where HCN is formed from the cyanide values and recovered by volatilization.

BACKGROUND OF THE INVENTION

Hydrogen cyanide, HCN, is a source of valuable compounds used in many industrial processes, e.g. KCN, NaCN and $Ca(CN)_2$. When solutions or waste streams contain cyanide compounds other than HCN, such as metallic complexes, it is often useful to convert these compounds to the more convenient salts which can be sold or used directly.

A further benefit of recovery of cyanide values from solution arises from restrictions on the disposal of cyanide compounds. Processes which produce cyanide compounds as a waste product must include some method for disposing of these cyanide compounds in an environmentally acceptable manner. Alternative solutions to the cyanide removal problem as applied to gold mill effluents are described in Scott and Ingles, "Removal of Cyanide from Gold Mill Effluents," Paper No. 21 of the Canadian Mineral Processors Thirteenth Annual Meeting, Ottawa, Ontario Canada, Jan. 20-22, 1981.

The cost of disposal can be somewhat offset if the cyanide values can be recovered for recycle in the process itself or for sale to another user. However, many of the most common cyanide removal techniques involve oxidation whereby the cyanide is destroyed. Moreover, recovery of useful cyanide from waste streams has proved to be particularly difficult when, as is typically the case, the cyanide is present in only low concentrations in the waste stream, e.g. on the order of less than about 0.5 percent by weight. Recovery of cyanide values is further complicated by the presence of metals in the waste stream and particularly by the tendency of cyanide to form complex ions with metals, such as Fe, Ni, Co, Zn and Cu.

One method which has been used to recover HCN from a cyanide-containing solutions is acidification/volatilization/reneutralization (AVR). This process takes advantage of the very volatile nature of hydrogen cyanide at low pH. In the AVR process, the waste stream is first acidified to dissociate $CN^-$ from metal complexes and to convert it to HCN. The HCN is volatilized usually by the introduction of steam, often accompanied by air sparging. The HCN evolved is then recovered, for example, in a lime solution and the cyanide-free wastestream is then reneutralized. A commercialized AVR method known as Mills-Crowe method is described in the Scott and Ingles paper. One difficulty with known AVR processes is that when a solution contains only low concentrations of cyanide compounds, the reagent costs for acidifying the stream and later neutralizing the waste solutions and/or the energy costs associated with raising the solution temperature to achieve volatilization become extremely high compared to the benefit of recovering the cyanide values.

As discussed in Ingles and Scott, "Overview of Cyanide Treatment Methods for Presentation at the Cyanide Cold Mining Seminar," Ottawa, Ontario, Canada, Jan. 22, 1981 and in U.S. Pat. Nos. 4,267,159 and 4,321,145, another method for cyanide removal from waste streams involves use of ion exchange resin beds. A number of resins, both weak and strong base, are known to be selective for both free and complexed cyanides. See for example, U.S. Pat. Nos. 3,984,314; 3,788,983; 4,267,159; 4,321,145; and 4,115,260. One problem associated with the use of strong base resins is the difficulty in eluting the cyanide once it is absorbed. Certain cyanide complexes, e.g. cyanide complex of Zn and Cd, are difficult to elute even from commercially available weak base resins.

U.S. Pat. Nos. 3,391,078 and 2,507,992 each disclose methods in which $Ca(OH)_2$ is used as a regenerant for certain ion exchange resins from which at least some cyanides can be eluted with hydroxides. Although lime or $Ca(OH)_2$ is economically preferred over NaOH as a reagent, its low solubility in water generally makes its use more difficult than more soluble hydroxides, e.g. NaOH.

While U.S. Pat. No. 4,321,145 suggests an AVR method to recover HCN from the cyanide loaded resin eluate, its teachings are limited to the use of a complex multi-level resin bed having a strong base anion exchange resin layer, a weak acid cation exchange resin and a strong acid cation exchange resin and the concomitant need for a complex resin regeneration sequence.

Accordingly, it is an object of the present invention to provide a novel method for recovering rather than destroying cyanide values from streams initially containing relatively low levels of cyanide, using weak base ion exchange resins to concentrate the cyanide before recovery.

Another object of the present invention is to provide an improved method of eluting complex cyanides, such as complexed zinc cyanide, from weak base resins.

Yet another object is to provide a unique system of concentrating cyanide in the eluant of an ion exchange resin using calcium hydroxide as the resin regenerant. A further object is to provide a novel calcium hydroxide elution circuit which permits full elution of cyanide values using a predetermined volume of eluant so as to concentrate the cyanide therein.

Still another object is to provide a method whereby acidification/volatilization techniques can be used to recover cyanide from low level cyanide streams due to effective concentrating of the cyanide values prior to acidification.

These and other advantages are achieved by practice of the processes of the present invention as described hereinbelow.

SUMMARY OF THE INVENTION

Cyanide values are efficiently recovered from streams containing low levels of cyanide by processes of the present invention wherein the cyanide values are first concentrated by use of weak base ion exchange resins selective for complex metal cyanides and capable of being eluted and regenerated by hydroxides. HCN is formed by acidification of the cyanide-enriched resin eluant and then volatilized for easy recovery as a gas which can optionally be neutralized to a more convenient form, e.g. $Ca(CN)_2$ or the like. More particularly, according to the process of the present invention, a solution containing cyanide values in the form of simple or complex ions is concentrated by first passing the solution through a weak base ion exchange resin (acid form). Free cyanide with any solids present in the feed stream pass through. The complex cyanide values are adsorbed on the resin and are eluted by a hydroxide. In a preferred embodiment, elution is by calcium hydroxide, preferably using a novel recycle system described herein which prevents dilution of the effluent despite the low solubility of $Ca(OH)_2$ in water. When complex zinc cyanide or other similar cyanide complexes are present in the feed stream, improved elution is achieved by the presence of thiocyanate in the elution circuit. When thiocyanate is present in the feed, the presence of thiocyanate during elution is secured by controlling the resin loading to a low level. Alternatively, thiocyanate may be advantageously added to the elution circuit. The eluate containing a high concentration of cyanide compounds is acidified by contact with an acid such as sulfuric acid. The acidified eluate is then heated, preferably by introduction of steam, to volatilize the hydrogen cyanide which is then recovered.

By means of the ion exchange resin concentration step, the concentration of cyanide values in the eluate which is sent to the acid volatilization step is sufficiently high such that the reagents and the heat supplied to the acid volatilization step are efficiently utilized. In one embodiment, any free cyanide in the stream is complexed prior to ion exchange to permit removing all cyanide from the initial stream, thereby enabling environmentally acceptable disposal of the cyanide-depleted solution.

DETAILED DESCRIPTION OF THE PREFERRED EMBODIMENT

Figure 1:
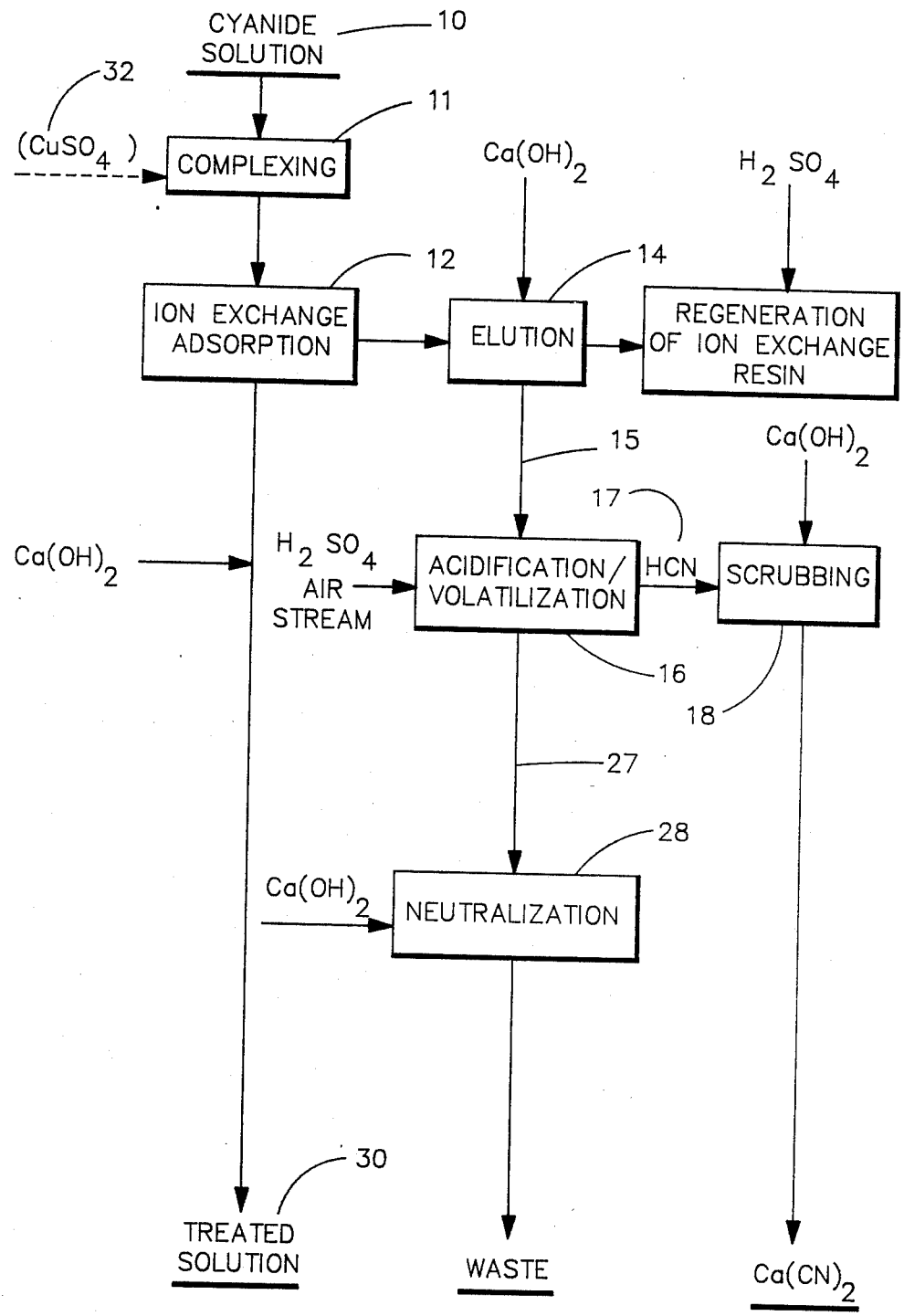
FIG. 1 is a diagrammatic representation of one embodiment depicting a method for recovery of cyanide from a waste solution combining an ion exchange resin adsorption step with an acid/volatilization step.

The processes of the present invention provide improved methods for recovering cyanide values from waste streams or solutions using acidification/volatilization techniques. These processes provide a unique overall processing scheme which permits use of weak base ion exchange resins which are easily eluted under mild hydroxide conditions to remove substantially all metal-cyanide complexes as well as most of the thiocyanate and or sulfide which may be present in the initial feed stream. Thiocyanate removed from the waste stream or added during elution, if necessary, is used to aid elution of some metal cyanide complexes, such as zinc cyanide, when such complexes are present in the feed stream. In addition, practice of the present invention, permits an overall system wherein inexpensive sulfuric acid and lime are the primary reagents. In particular, the novel resin elution/regeneration circuit of the present invention permits elution using calcium hydroxide while nevertheless producing a cyanide-enriched eluate suitable as a feed for hydrogen cyanide recovery by acidification/volatilization.

According to the processes of the present invention, a complex metal cyanide-containing feed is first passed through a weak base anion exchange resin in acid form in order to concentrate the complex cyanides from the solution and remove any thiocyanates which may be present. The cyanides adsorbed on the resin are eluted with a basic solution. When the basic solution comprises calcium hydroxide, it is recycled through the resin continuously, while maintaining the solution at hydroxide saturation, until the resin has been substantially stripped of its cyanide load, as indicated, for example, by an increase in the solution pH to above about 11. The resulting eluate contains a significantly higher concentration of complex cyanide than the initial stream, e.g. more than about 0.5 wt. % cyanide and preferably from about 15 to about 25 grams total cyanide per liter. The concentrated or cyanide-enriched stream then undergoes acidification and volatilization of the acid in an efficient manner for recovery of the initial cyanide values. Cyanide values present as stable cobalto- and ferrocyanide complexes, which are not susceptible to acidification, result in a cyanide loss. However, these cyanide values which are removed from the initial stream, though not recovered, are placed in concentrated form more suitable for disposal.

Typical feeds useful for practice of the present invention are those containing relatively dilute concentrations of complex and/or free cyanide, for example, less than about 0.5 wt. % cyanide. Although the process of the present invention may be practiced with a variety of dilute cyanide solutions, the process is particularly useful for treating industrial waste streams such as those produced by mining, petrochemical and plating operations. Metals milling and recovery operations, for example uranium, copper, silver and particularly gold processing, produce waste streams containing environmentally unacceptable amounts of cyanide, typically in a dilute solution. The various industrial operations typically provide waste streams in an amount from 10 to $10^7$ gallons per day. Such waste streams may contain from about 1 mg/l to over 50 grams per liter of total cyanide. Many such streams will also contain other toxic materials such as thiocyanate (CNS) and sulfides which may also be beneficially removed by practice of the present invention. Similarly, such feeds will often contain one or more metal contaminants such as copper, zinc, iron, nickel, cobalt, chromium, and cadmium, with which cyanide forms metal complexes. One or more of such metal complexes are prevalent in the waste streams emanating from mining and metals recovery processing. Waste leach solutions from mining operations typically contain cyanides in concentrations of 10 to 2500 milligrams per liter. As will be known and understood by those skilled in the art, various modifications to the processes described herein will be dictated by the makeup of the feed stream.

The ion exchange resins useful for practice of the invention are weak base anion exchange resins. Virtually any weak base anion exchange resin selective for metal cyanide complexes and capable of being eluted by hydroxide can be employed. Preferred resins are those typically having tertiary amine functionality in a suitable matrix, such as acrylics or styrene. Exemplary of such resins are Amberlite IRA-35 and IRA-99, commercially available from Rohm & Haas Co. Dowex WGR or MWA-1 produced by Dow Chemical Co., Duolite A-2 or A-4 produced by Diamond Shamrock Corp. are suitable for the processes of the present invention as well.

Suitable anion exchange resins are first placed in acid form prior to contact with a cyanide-containing feed stream. The resin is acidified by contact with an acid such as sulfuric acid according the following reaction:

$$2RN + H_2SO_4 \rightarrow (RNH)_2SO_4 \qquad (i)$$

where RN=resin in free amine form.

During adsorption, there is an exchange of the polyvalent metal cyanide complexes for sulfate. Adsorption occurs according to reactions such as the following with $Cu(CN)_3{}^{-2}$ as the complex:

$$(RNH)_2SO_4 + Cu(CN)_3{}^{-2} \rightarrow (RNH)_2Cu(CN)_3{}^{-} + SO_4{}^{-2} \qquad (ii)$$

Operation of the ion exchange beds is by conventional means. However, in some instances lower than normal resin loading is preferred. In particular, when the feed stream contains sulfides and/or thiocyanate, low resin loading (about 0.5 to 3 lbs. $CN^T/ft^3$ resin) with respect to the metal-cyanide complexes will provide removal of both thiocyanate and sulfides. In general, when thiocyanate is present in the feed stream, resin loading will be such to assure only partial loading. Preferably, the resin is loaded with complex metal cyanides to a point at or below which the thiocyanate is no longer being totally adsorbed by the resin and thus "breaks through" to appear in the treated solution or resin effluent.

As will be known and understood by those skilled in the art, the weak base anion exchange resins used for practice of the present invention do not and are not intended to remove free cyanide which passes through the resin bed and which is present in the treated solution or resin effluent. The free cyanide-containing effluent may be recycled for use where the waste producing operation calls for cyanide leach or the like. Alternatively, where the resin bed effluent is to be disposed of and/or a cyanide-free effluent is otherwise desirable, free cyanide removal is effected by first complexing the free cyanide of the feed stream prior to the ion exchange step. Such complexing is typically achieved by addition of a metal salt such as copper sulfate or ferrous sulfate to the feed stream.

According to the present invention, the presence of thiocyanate is particularly advantageous when zinc cyanide and/or cobalt cyanide complexes (or other similar metal cyanide complexes which are known to be more difficult to elute from strong base resins, e.g. quarternary amines and/or known not to decompose during acidification) have been adsorbed on the resin. It has been found that the presence of thiocyanate in the elution circuit aids in eluting such metal cyanides. Similarly, as described more fully below, it has been found that the presence of thiocyanate during acification/volatilization may enhance total cyanide recovery by complexing some of the copper which would otherwise form insoluble precipitates with CN and thereby prevent recovery of that CN. Accordingly, as indicated hereinabove, when the initial feed stream contains thiocyanate, resin loading is such that the thiocyanate is adsorbed on the resin and is thus eluted and present in the elution circuit for aiding elution of the metal complexes. Low loading thus has a potential three-fold benefit, namely, removal of thiocyanate as a contaminant of the waste stream, assuring its presence during elution and/or assuring its presence during acidification/volatilization. In instances where no thiocyanate or an insufficient amount of thiocyanate is present in the original feed stream, it may be nevertheless advantageous to add it for purposes of aiding elution and/or enhancing overall CN recovery. Typically, such addition will be in the elution circuit and/or to the eluate prior to acidification. Thus, it is preferred, when the feed stream contains substantial amounts of copper and/or zinc cyanide compounds to interrupt or otherwise monitor the resin adsoption or ion exchange in order to assure partial loading at a level less than that at which thiocyanate breakthrough occurs.

Metal cyanide complexes are desorbed from the anion exchange resin during the elution step under mildly basic conditions, e.g. from about pH 9 to about pH 13. While sodium hydroxide may be used, it is particularly advantageous from an economic point of view to use lime or other sources of calcium hydroxide. In preferred embodiments of the present invention, calcium hydroxide is used to yield a concentrated solution of cyanide complexes, leaving the resin in its free amine form for reuse after regeneration to acid form. Because of the poor solubility of calcium hydroxide in water, a single pass of calcium hydroxide hydroxide-saturated solution will only partially elute the resin. Sustained one-pass treatment with calcium hydroxide-saturated solution will eventually elute the resin to a satisfactory degree, however, the resultant large volume eluate contains cyanide in an undesirably low concentration for use as a feed to the acidification/volatilization step. Thus according to the present invention, a novel calcium hydroxide elution/regeneration circuit is provided.

A quantity of calcium hydroxide-saturated solution, typically of a predetermined volume, is repeatedly recycled through the loaded resin to produce an eluate having cyanide concentrations high enough to make acidification/volatilization of the eluate economically attractive.

The adsorbed CN complexes are eluted from the resin with a weak base such as a saturated $Ca(OH)_2$ solution, yielding a concentrated solution of the cyanide complexes, and leaving the resin in its free amine form for recycle. In order to maintain the eluting fluid in a calcium hydroxide-saturated condition, the eluting fluid is contacted with a bed of solid calcium hydroxide or other source of calcium hydroxide prior to recycle to the resin. The eluting fluid is provided in a quantity sufficient to hold in solution substantially the entire cyanide load of the partially loaded resin, but of a volume small enough that the resulting cyanide concentration in the eluate may be economically recovered. The pH of the solution exiting the resin column can act as an indicator of the completeness of elution. The eluting fluid is preferably recycled through the resin column until the exiting fluid attains a pH greater than about 11, preferably greater than about 12. Elution preferably occurs at a flow rate of about 0.5 to about 5.0 gpm/ft², preferably from about 1 to about 2 gpm/ft², and at a temperature of from about 10° to about 60° C., preferably from about 20° to about 40° C.

The elution of the resin proceeds according to a reaction such as the following wherein $Cu(CN)_3{}^=$ is the complex cyanide:

$$(RNH)_2Cu(CN)_3 + Ca(OH)_2 \rightarrow 2RN + CaCu(CN)_3 + 2H_2O \qquad (iii)$$

Elution according to this reaction leaves the resin in the free amine form. The resin must therefore be acidified, as described above, before it is again contacted with the feed stream to initiate another cycle of partial resin loading and elution. Regeneration (acidification) of the resin may be preceded by flushing the resin with fresh water or with a solution having a low cyanide content.

The eluate, now containing from about 5 to about 25 g/l of total cyanide, and particularly containing a higher concentration of cyanide than the initial feed stream, is treated to recover the cyanide values therefrom by an acidification/volatilization step. The eluate is first acidified with a reagent, such as $H_2SO_4$ or $SO_2$, which acts to release the CN from most of the metal cyanide complex ions present in the eluate and permit formation of HCN. In the preferred embodiment, acidification is accomplished using $H_2SO_4$, typically in a concentration of from about 1.0 to about 40 g/l, preferably about 10 to about 20 g/l $H_2SO_4$ in the acidified mixture.

Cyanide losses during acidification/volatilization are generally due to formation of insoluble precipitates such as $Cu_2Fe(CN)_6$, CuCN, $2CuCNS \cdot CuCN$, and $Co(CN)_6^{-4}$ compounds. Of the metal complexes normally present in mining waste solutions, uncomplexed CN, and the complexes of Zn, Ni, and Cd decompose readily on acidification with $H_2SO_4$, generating HCN and metal sulfates. The Cu complexes decompose to a large extent but some insoluble CuCN may be formed. Though practice of the present invention does not result in complete recovery of cyanide from such complexes, nor from the thiocyanate present, it does result in concentration of these values in the eluant.

As mentioned hereinabove, in practice of the present invention it has been found that the presence of thiocyanate may be beneficial to overall cyanide recovery. Without intending to be bound by any theory, it is believed that, for example, when CuCN is present, the presence of CNS aids in overall CN recovery, the following replacement reactions may occur:

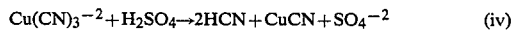

$$Cu(CN)_3^{-2} + H_2SO_4 \rightarrow 2HCN + CuCN + SO_4^{-2} \quad (iv)$$

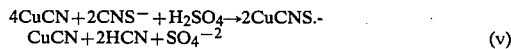

$$4CuCN + 2CNS^- + H_2SO_4 \rightarrow 2CuCNS \cdot CuCN + 2HCN + SO_4^{-2} \quad (v)$$

The hydrogen cyanide formed by the acidification of the eluate is volatilized by heating. Preferably the heat necessary is added by introduction of steam. Air sparging can be employed to separate the volatilized HCN. The rate at which HCN is evolved is dependent on the rate that $H_2SO_4$ is added, temperature, vacuum, rate of air sparging, and the specific $CN^-$-containing compound. The CN associated with free CN and the easily decomposed complexes is evolved rapidly as HCN on acidifying. Additional time is required to remove the soluble HCN from solution, and to decompose CuCN and/or ferrocyanides, cobaltocyanides which may be present.

The volatilized HCN is then recovered, as for example by scrubbing with a mild $Ca(OH)_2$ solution or with NaOH thereby converting the cyanide to reusable $Ca(CN)_2$ or NaCN, which can be recycled as a cyanide reagent or commercially disposed of. Effluent from the volatilization step may be neutralized by contact with, for example, a lime solution, producing a substantially cyanide-free waste stream suitable for disposal.

Referring now to FIG. 1 which is a block diagram of the overall process, the cyanide-containing feed stream 10 passes through the ion exchange step 12 wherein the metal cyanide complexes are adsorbed on the weak base anion exchange resin. Optionally, prior to entering the ion exchange step, the feed solution 10 may undergo complexing 11 of any free cyanide present, by addition of copper sulfate 32 or other metal salt wherein the cation is among those metals which complex cyanide.

The treated solution 30 leaving the ion exchange will have free cyanide where such is present in the feed stream and not complexed prior to ion exchange. In such instances, the treated solution 30 is appropriate for recycle to a cyanide leach step or other process operation step (not shown) utilizing free cyanide. Of course caution should be exercised when the pH is low as any free cyanide present in the treated stream will be in the form of hydrogen cyanide.

Upon completion of the ion exchange 12, the complex cyanides adsorbed on the resin undergo elution 14 by contact with hydroxide, preferably calcium hydroxide. The eluant 15 is cyanide-enriched and passes to acidification/volatilization step 16. The eluant is contacted with an acid such as sulfuric acid to free the cyanide and form hydrogen cyanide which is then volatilized by heating and/or air sparging The volatilized HCN 17 is collected by scrubbing with calcium hydroxide or the like 18 to form cyanide salts, such as $Ca(CN)_2$ or NaCN. The acidified solution remaining 27 is then reneutralized with calcium hydroxide and is suitable for waste disposal.

Figure 2:
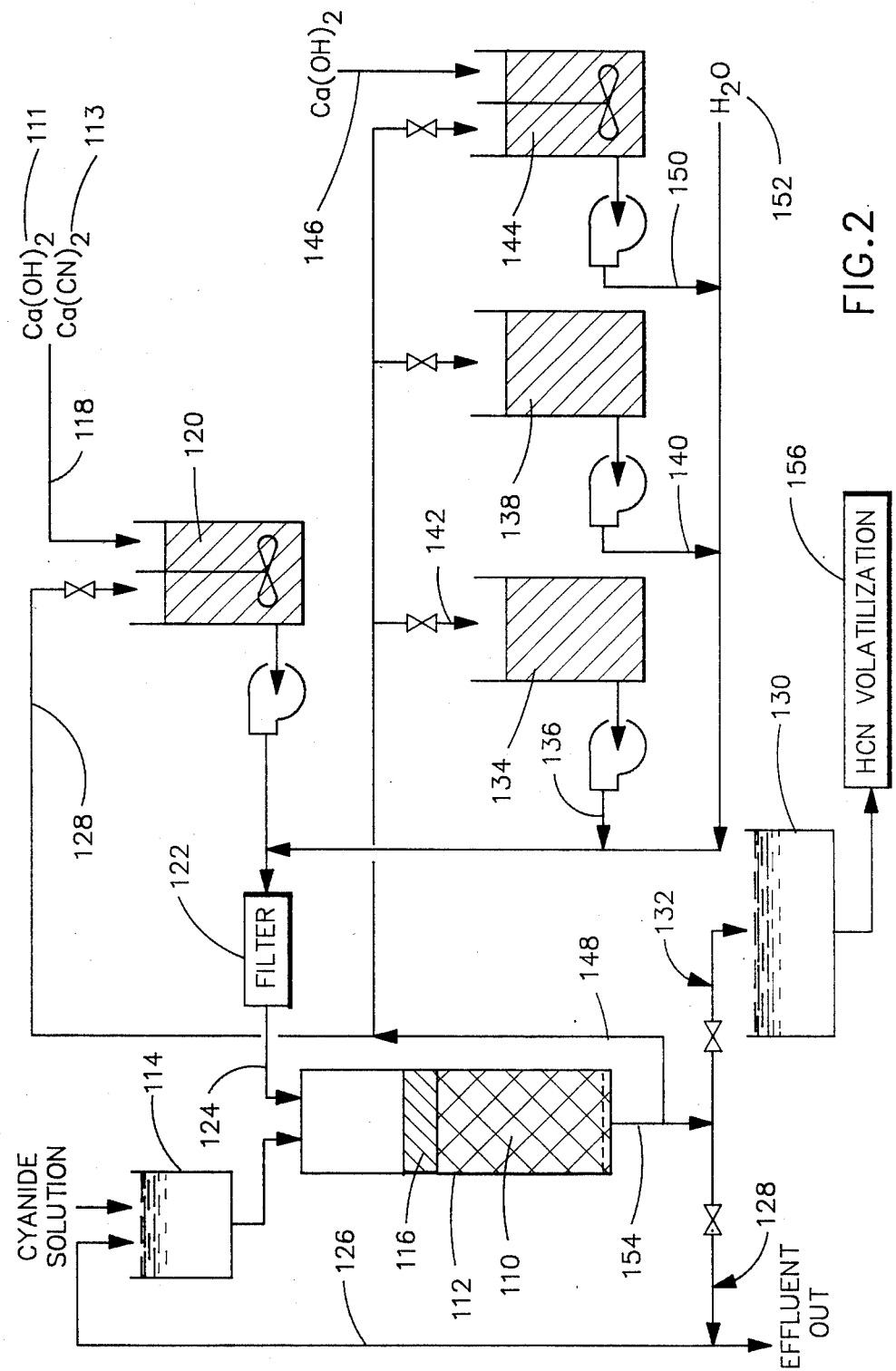
FIG. 2 is a schematic flow diagram depicting a Ca-$(OH)_2$ elution circuit.

Referring now to FIG. 2, in which the preferred embodiment of this invention, including a novel calcium hydroxide elution circuit, is depicted, a weak base resin 110 is packed into a column 112 and contacted with a cyanide-containing feed solution 114. Partial loading of the resin 110 is effected. When the desired partial loading is achieved, the feed stream 114 flow to the column 112 is stopped, leaving a quantity of solution 116 in the packed column 112. $Ca(OH)_2$ 111 and $Ca(CN)_2$ 113 are added via line 118 to recycle tank 120, which contains solution from the previous elution cycle as described hereinafter. The solution of tank 120 will typically be of a predetermined volume equalling the minimum which is economically viable to elute the resin in the manner described herein. The contents of the recycle tank 120 are filtered by filter 122 and introduced to the packed column 112 by line 124. As the recycle solution from tank 120 enters the column 112, the solution 116 in the column is displaced via line 126 to the column feed tank 114. When substantially all of the solution 116 which was present in the column 112 when flow of feed stream 114 to the column 112 was stopped, has been sent to the feed tank 114, the recycle solution originally from tank 120 which has been sent through column 112 is directed back to the recycle tank 120 by line 128. In this fashion, the solution from the recycle tank 120 is continuously cycled over a $Ca(OH)_2$ bed, through the filter 122 and packed column 112 and returned to the recycle tank 120 at a predetermined rate. The previously added amount of $Ca(OH)_2$ 111 and $Ca(CN)_2$ 113 maintains the recycle tank solution 120 near $Ca(OH)_2$ saturation. The recycle circuit is continued until the pH of the solution 128 leaving the column 112 is increased from its original value of between 8 and 9 to a value of between 11 and 12, typically occurring in about 2 hours. As will be understood in practice the actual time is dependent upon the flow rate $Ca(OH)_2$-saturated solution through the resin, i.e. on the amount of $OH^-$ passing through the resin.

The recycle is then terminated and the pregnant resin eluate is directed to the HCN volatilization head tank 130 by line 132. A saturated $Ca(OH)_2$ solution from the first flush tank 134 is sent to the column 112 by line 136, displaces the pregnant resin eluate leaving the column 112. An amount of the pregnant resin eluate equal to the quantity of solution 116 in packed column 112 when feed flow 114 to column 112 is first stopped, with makeup from the first flush tank 134 if necessary, is directed to the HCN volatilization head tank 130. After that amount of eluate has been directed to the HCN volatilization head tank 130, the solution 148 leaving the resin column is directed to the recycle tank 120 by line 128, with displacement fluid for the column 112 coming, first, from the first flush tank 134 and, when that is depleted, from the second flush tank 138 via line 140. An amount of solution equal to the column volume of resin is directed to the recycle tank 120 in this fashion, and when this amount has been accumulated in the recycle tank 120, the solution leaving the resin column 148 is directed to the first flush tank 134 via line 142 with the displacement fluid for the column 112 coming, first, from the second flush tank 138 and then from the third flush tank 144 via line 150 which contains a barren solution to which $Ca(OH)_2$ has been added by line 146 to form a solution saturated with $Ca(OH)_2$. After the column volume of solution has accumulated in the first flush tank 134, the solution 148 leaving the resin column 112 is directed, in turn, to the second flush tank 138 and the third flush tank 144, with the replacement fluid coming, first, from the third flush tank 144 and then from a fresh water supply 152. This procedure is continued until the column of volume of fluid has accumulated in each of the second flush tank 138 and the third flush tank 144. Fresh water flush of the resin is then continued until most of the entrained CN in resin column 112 is displaced, with the effluent being directed to the column feed tank 114 by line 126. The system is now in the condition it was at the beginning of the elution cycle, except that the resin 110 is stripped of the cyanide load and has been converted to the free amine form. The resin is acid-treated and the cyanide feed 114 is again directed to the resin column 112 to partially load the resin and the process described above is repeated. The filter 122 is cleaned as required and solids removed therefrom comprising unreacted $Ca(OH)_2$, $CaSO_4.2H_2O$ and minor amounts of metal cyanide insolubles are disposed of to the tailings area.

A number of modifications of the preferred embodiment may be employed to accommodate specific applications. Since free cyanide is not adsorbed by the ion exchange resin 110, it will appear in the ion exchange effluent 154 which may be recycled back to the operation. If the effluent 154 is to be discharged, the free cyanide can be complexed with a copper salt or other suitable metal salt 132 and removed along with the other complexes.

The greater part of stable ferro- and cobaltocyanide complex ions are not recovered in the acidification/volatilization step 156, but appear in concentrated form in the waste stream.

Alternatively, scrubbing step 18 may be conducted with a reagent such as sodium hydroxide to form reusable NaCN.

The following examples are provided by way of illustration and not by way of limitation.

EXPERIMENTAL

Three different solutions were used in Examples 1–3 which follow. Solution 1 was synthetic prepared from reagent grade NaCN, CuCN and sulfate salts. Solutions 2 and 3 were actual barren Merrill-Crowe (MC) solutions spiked with $Na_2Cu(CN)_3$ and sulfate salts to simulate waste solutions which might be obtained from cyanide leaching of high-copper and gold ore. Analyses of Solutions 1–3 are given in Table 1.

TABLE 1

Analysis of Synthetic and Spiked Solutions Used in Test Work

| | Assay, g/l | | |
|---|---|---|---|
| | No. 1[1] | No. 2[2] | No. 3[3] |
| CN, total | 1.45 | 1.20 | 1.10 |
| CNS | 0.34 | 0.34 | 0.34 |
| Cu | 0.24 | 0.24 | 0.49 |
| Zn | 0.094 | 0.085 | 0.090 |
| Fe | 0.094 | 0.089 | 0.049 |
| Ni | 0.098 | 0.095 | 0.007 |
| Co | 0.10 | 0.10 | 0.0008 |
| Cd | 0.12 | 0.11 | 0.0002 |
| Au | | | 0.1 mg/l |
| $S^{-2}$ | | | 0.01 |
| $S_2O_3^{-2}$ | | | 0.1 |
| $CNO^-$ | | | 0.1 |
| pH | 10.5 | 10.5 | 10.6 |

[1]Prepared with NaCN, CuCN, Zn/Co/Ni/CdSO$_4$, NaCNS, and K$_4$Fe(CN)$_6$.
[2]MC solution spiked with Co/Ni/CdSO$_4$ and K$_4$Fe(CN)$_6$.
[3]MC solution spiked from 0.25 to 0.49 g/l Cu with Na$_2$Cu(CN)$_3$.

EXAMPLE 1

Short-term stability tests were run in order to determine the performance of certain resins during repeated acidification, adsorption and elution cycles. The tests were run using two weak base resins, Amberlite IRA-35 and IRA-99 made by Rohm & Haas. Both resins have polyamine functionality but differ in matrix. Four experiments were run, testing each of the two resins with each of the feed solutions shown in Table 1. For each test, the resin was subjected to nine loading/elution cycles in a 5 cm diameter column. Test conditions and results are given in Table 2A. After nine cycles, a 30 cc portion of the resin was transferred to a 1.5 cm diameter column and compared to 30 cc fresh, conditioned resin in the identical column under identical acidification adsorption elution conditions.

The results of the tests using the synthetic solution (No. 1) to load the resins showed no apparent chemical problems or physical degradation in ten cycles for both resins. A comparison of the 2 and 10 cycle results is presented in Table 2B.

Resin elution processes using a number of eluants were compared. Tests conditions and results are presented in Table 2C.

TABLE 2A

Amberlite IRA-35/99 Resins, Synthetic Solution Stability Test

Conditions

| 1. Acidification | Resins, | Series 2(99) - Amberlite IRA-99, 20 × 50 mesh; 40 cc |
| | | Series 2(35) - Amberlite IRA-35, 35, 20 × 50 mesh; 40 cc |
| | Column | 5 cm diam |
| | $H_2SO_4$ soln | 0.10 N $H_2SO_4$, 500 ml (50 meq) |
| | Flow rate | 30/40 ml/min |

TABLE 2A-continued

Amberlite IRA-35/99 Resins, Synthetic Solution Stability Test

| | | | |
|---|---|---|---|
| | Temperature | 22-24° C. | |
| | Wash | $H_2O$, 300 ml | |
| 2. Adsorption | Synthetic solution as shown below: 1500 ml | | |

| | Assay g/l | Reagent |
|---|---|---|
| Cu | 0.25 | $Na_2Cu(CN)_3$ |
| Zn | 0.10 | $ZnSO_4 + 4NaCN$ |
| Fe | 0.10 | $K_4Fe(CN)_6 \cdot 3H_2O$ |
| Co | 0.10 | $CoSO_4 + 6NaCN$ |
| Ni | 0.10 | $NiSO_4 + 4NaCN$ |
| CNS | 0.34 | NaCNS |
| $CN^F$ | 0.20 | NaCN |
| Cd | 0.10 | $CdSO_4 + 4NaCN$ |

| | | |
|---|---|---|
| | Wash | $H_2O$, 100 ml |
| 3. Elution | Eluant | 1.5 g/l $Ca(OH)_2$ + 4.1 g/l NaCNS + 1.0 g/l NaCN, 1600 ml |
| | Wash | $H_2O$, 300 ml |

Results: Cycles 1-9

| Cycle | 1 | | 2 | | 3 | | 5 | | 7 | | 9 | |
|---|---|---|---|---|---|---|---|---|---|---|---|---|
| Resin IRA- | 35 | 99 | 35 | 99 | 35 | 99 | 35 | 99 | 35 | 99 | 35 | 99 |
| Acidification | 36.5 | 33.3 | | | 37.5 | | 30.6 | 36.6 | | | | |
| $H_2SO_4$ consumed, meq. | | | | | | | | | | | | |
| Adsorption | | | | | | | | | | | | |
| Adsorbed, meq. | | | | | | | | | | | | |
| Cu | | | | | | | 3.59 | 6.49 | | | | |
| Zn | | | | | | | 2.98 | 3.64 | | | | |
| Ni | | | | | | | 1.98 | 3.36 | | | | |
| Co | | | | | | | 4.64 | 5.62 | | | | |
| Cd | | | | | | | 1.33 | 2.65 | | | | |
| Fe | | | | | | | 6.35 | 5.74 | | | | |
| CNS | | | | | | | | | | | | |
| Total cations | | | | | | | 20.86 | 27.51 | | | | |
| Elution | | | | | | | | | | | | |
| Eluted, meq. | | | | | | | | | | | | |
| Cu | 2.16 | 4.02 | 1.99 | 4.98 | | 6.21 | 3.86 | 5.60 | 3.98 | 6.34 | 3.83 | 6.01 |
| Zn | 5.18 | 3.75 | 3.96 | 3.70 | 3.08 | 2.67 | 3.45 | 2.63 | 3.19 | 2.40 | 3.12 | |
| Ni | 1.79 | 3.14 | 1.59 | 3.19 | 2.91 | 1.98 | 3.24 | 1.82 | 3.19 | 1.83 | 3.01 | |
| Co | 6.02 | 4.15 | 5.07 | 5.04 | 5.42 | 5.78 | 5.31 | 5.81 | 5.14 | 5.15 | 5.24 | |
| Cd | 1.49 | 2.76 | 1.43 | 2.28 | 2.15 | 1.39 | 2.25 | 1.24 | 2.07 | 1.17 | 2.12 | |
| Fe | 9.38 | 4.38 | 8.00 | 4.94 | 5.02 | 6.30 | 5.23 | 5.95 | 4.96 | 5.57 | 5.06 | |
| Total cations | 26.0 | 22.2 | 22.2 | 24.1 | 24.8 | 22.0 | 25.2 | 21.4 | 24.9 | 20.0 | 24.6 | |
| Base consumed, meq. | 33 | 23 | 35 | 29 | | 29 | 25 | | | | | |

TABLE 2B

Comparison of Ten-Cycle and Two-Cycle Amberlite IRA-35/99 Resins Synthetic Solution (No. 1)

| | | Conditions |
|---|---|---|
| 1. Pre-elution | Resin | 10-cycle - Amberlite IRA-99 from Cycle 9; 30 cc |
| | | 2-cycle - Fresh Amberlite IRA-99 conditioned 1 cycled; 30 cc |
| | | 10-cycle - Amberlite IRA-35 from Cycle 9; 30 cc |
| | | 2-cycle - Fresh Amberlite IRA-35 conditioned 1 cycle; 30 cc |
| | Column | 1.5 cm diam × 17 cm |
| | Eluant | 1.5 g/l $Ca(OH)_2$ and 4.1 g/l NaCNS and 1.0 g/l NaCN; 300 ml |
| | Flow rate | 7 ml/min (=1 gpm/ft$^2$) |
| | Temperature | 23° C. |
| | Wash | $H_2O$, 300 ml |
| 2. Acidification | Feed solution | 0.10 N $H_2SO_4$; 375 ml (37 meq) |
| | Wash | $H_2O$, 200 ml |
| 3. Adsorption | Feed solution | Synthetic solution No. 1; 1500 ml |
| | Wash | $H_2O$, 100 ml |
| 4. Elution | Eluant | 1.5 g/l $Ca(OH)_2$ + 4.1 g/l NaCNS + 1.0 g/l NaCN; 1500 ml |
| | Wash | $H_2O$, 200 ml |

Results

1. Amberlite IRA-35, adsorption

| Volume BV | | Effluent Assay, g/l | | | | | | | |
|---|---|---|---|---|---|---|---|---|---|
| | | Cu | | Zn | | Cd | | Ni | |
| 2 Cycle | 10 Cycle | 2 Cycle | 10 Cycle | 2 Cycle | 10 Cycle | 2 Cycle | 10 Cycle | 2 Cycle | 10 Cycle |
| 5 | 6 | <0.0001 | <0.0001 | 0.0002 | 0.0003 | 0.0079 | 0.015 | <0.0001 | <0.0001 |
| 11 | 12 | <0.0001 | <0.0001 | <0.0001 | 0.0001 | 0.016 | 0.024 | <0.0001 | <0.0001 |
| 19 | 20 | <0.0001 | 0.0006 | <0.0001 | <0.0001 | 0.030 | 0.045 | <0.0001 | 0.0002 |
| 29 | 29 | 0.031 | 0.14 | 0.0002 | 0.0007 | 0.046 | 0.087 | 0.0070 | 0.036 |
| 38 | 41 | 0.53 | 0.51 | 0.0043 | 0.014 | 0.17 | 0.15 | 0.16 | 0.17 |
| 44 | 47 | 0.45 | 0.43 | 0.0078 | 0.021 | 0.15 | 0.14 | 0.16 | 0.16 |

| Volume | Effluent Assay, g/l |
|---|---|

TABLE 2B-continued
Comparison of Ten-Cycle and Two-Cycle Amberlite IRA-35/99 Resins Synthetic Solution (No. 1)

| BV | | Co | | Fe | | CNS | |
|---|---|---|---|---|---|---|---|
| 2 Cycle | 10 Cycle | 2 Cycle | 10 Cycle | 2 Cycle | 10 Cycle | 2 Cycle | 10 Cycle |
| 5 | 6 | <0.0001 | <0.0001 | 0.0002 | 0.0002 | 0.002 | <0.002 |
| 11 | 12 | <0.0001 | <0.0001 | <0.0001 | 0.0002 | 0.011 | 0.02 |
| 19 | 20 | <0.0001 | 0.0002 | <0.0001 | <0.0001 | 0.35 | 0.43 |
| 29 | 29 | 0.0054 | 0.018 | 0.0003 | 0.0017 | 0.52 | 0.58 |
| 38 | 41 | 0.069 | 0.081 | 0.013 | 0.029 | 0.30 | 0.31 |
| 44 | 47 | 0.079 | 0.092 | 0.033 | 0.51 | 0.30 | 0.32 |

2. Amberlite IRA-35, elution

| Volume BV | | Eluate Assay, g/l | | | | | | |
|---|---|---|---|---|---|---|---|---|
| | | Cu | | Zn | | Cd | | Ni | |
| 2 cycle | 10 Cycle | 2 Cycle | 10 Cycle | 2 Cycle | 10 Cycle | 2 Cycle | 10 Cycle | 2 Cycle | 10 Cycle |
| 6 | 7 | 0.26 | 0.19 | 0.053 | 0.084 | 0.13 | 0.13 | 0.13 | 0.11 |
| 15 | 16 | 0.035 | 0.018 | 0.36 | 0.35 | 0.076 | 0.058 | 0.040 | 0.025 |
| 24 | 26 | 0.002 | 0.0005 | 0.088 | 0.052 | 0.014 | 0.0080 | 0.0017 | 0.0012 |
| 36 | 39 | 0.0002 | <0.0001 | 0.0028 | 0.0017 | 0.0010 | 0.0006 | 0.0002 | 0.0002 |
| 49 | 53 | <0.0001 | <0.0001 | 0.0002 | 0.0002 | 0.0002 | <0.0001 | <0.0001 | 0.0002 |
| Resin | | <0.005 | <0.005 | <0.005 | <0.005 | <0.005 | <0.005 | <0.005 | <0.005 |

| Volume BV | | Eluate Assay, g/l | | | | | | |
|---|---|---|---|---|---|---|---|---|
| | | Co | | Fe | | CNS | | |
| 2 Cycle | 10 Cycle | 2 Cycle | 10 Cycle | 2 Cycle | 10 Cycle | 2 Cycle | 10 Cycle |
| 6 | 7 | 0.10 | 0.12 | 0.19 | 0.23 | 2.80 | 2.85 |
| 15 | 16 | 0.20 | 0.19 | 0.21 | 0.20 | 2.90 | 2.86 |
| 24 | 26 | 0.073 | 0.029 | 0.035 | 0.15 | 2.80 | 2.77 |
| 36 | 39 | 0.0003 | 0.0002 | 0.0004 | <0.0001 | 2.81 | 2.80 |
| 49 | 53 | 0.0001 | <0.0001 | <0.0001 | <0.0001 | 2.80 | 2.79 |
| Resin | | <0.005 | <0.005 | <0.005 | <0.005 | | |

3. Amberlite IRA-99, adsorption

| Volume BV | Effluent Assay, g/l | | | | | | | |
|---|---|---|---|---|---|---|---|---|
| | Cu | | Zn | | Cd | | Ni | |
| | 2 Cycle | 10 Cycle | 2 Cycle | 10 Cycle | 2 Cycle | 10 Cycle | 2 Cycle | 10 Cycle |
| 6 | <0.0001 | <0.0001 | 0.0012 | 0.0015 | 0.0039 | 0.0046 | 0.0001 | 0.0001 |
| 12 | <0.0001 | <0.0001 | 0.0004 | 0.0005 | 0.0017 | 0.0018 | 0.0002 | 0.0002 |
| 22 | 0.0002 | 0.0010 | <0.0001 | 0.0002 | 0.0007 | 0.0002 | 0.0002 | 0.0002 |
| 31 | 0.038 | 0.055 | <0.0001 | 0.0002 | 0.0003 | 0.0003 | 0.0045 | 0.0078 |
| 43 | 0.34 | 0.34 | 0.0002 | 0.0007 | 0.017 | 0.021 | 0.050 | 0.051 |
| 49 | 0.43 | 0.43 | 0.0008 | 0.0021 | 0.044 | 0.051 | 0.079 | 0.080 |

| Volume BV | Effluent Assay, g/l | | | | | | |
|---|---|---|---|---|---|---|---|
| | Co | | Fe | | CNS | | |
| | 2 Cycle | 10 Cycle | 2 Cycle | 10 Cycle | 2 Cycle | 10 Cycle |
| 6 | <0.0001 | <0.0001 | <0.0001 | <0.0001 | 0.017 | 0.014 |
| 12 | <0.0001 | <0.0001 | <0.0001 | <0.0001 | 0.014 | 0.011 |
| 22 | 0.0004 | 0.0011 | <0.0001 | 0.0002 | 0.056 | 0.043 |
| 31 | 0.020 | 0.026 | 0.013 | 0.016 | 0.63 | 0.58 |
| 43 | 0.10 | 0.098 | 0.065 | 0.066 | 0.83 | 0.83 |
| 49 | 0.12 | 0.12 | 0.080 | 0.082 | 0.51 | 0.51 |

4. Amberlite IRA-99, elution

| Volume BV | Eluate Assay, g/l | | | | | | | |
|---|---|---|---|---|---|---|---|---|
| | Cu | | Zn | | Cd | | Ni | |
| | 2 Cycle | 10 Cycle | 2 Cycle | 10 Cycle | 2 Cycle | 10 Cycle | 2 Cycle | 10 Cycle |
| 6 | 0.60 | 0.61 | 0.061 | 0.075 | 0.31 | 0.31 | 0.29 | 0.28 |
| 14 | 0.091 | 0.080 | 0.41 | 0.39 | 0.29 | 0.28 | 0.46 | 0.44 |
| 23 | 0.0021 | 0.0019 | 0.029 | 0.028 | 0.33 | 0.032 | 0.0035 | 0.0030 |
| 34 | 0.0006 | 0.0005 | 0.0074 | 0.0071 | 0.015 | 0.014 | 0.0007 | 0.0006 |
| 46 | 0.0002 | 0.0002 | 0.0032 | 0.0032 | 0.0086 | 0.0081 | 0.0004 | 0.0002 |
| Resin wt % | <0.005 | <0.005 | 0.022 | 0.019 | 0.085 | 0.073 | <0.005 | <0.005 |

| Volume BV | Eluate Assay, g/l | | | | | |
|---|---|---|---|---|---|---|
| | Co | | Fe | | CNS | |
| | 2 Cycle | 10 Cycle | 2 Cycle | 10 Cycle | 2 Cycle | 10 Cycle |
| 6 | 0.21 | 0.21 | 0.19 | 0.20 | 2.29 | 2.20 |
| 14 | 0.12 | 0.11 | 0.14 | 0.13 | 2.74 | 2.69 |
| 23 | 0.0028 | 0.0032 | 0.0029 | 0.0026 | 2.65 | 2.67 |
| 34 | 0.0010 | 0.0014 | 0.0006 | 0.0006 | 2.75 | 2.63 |
| 46 | 0.0007 | 0.0010 | 0.0005 | 0.0004 | 2.76 | 2.77 |
| Resin wt % | 0.13 | 0.17 | 0.032 | 0.031 | | |

TABLE 2C
RESIN ELUTION TESTS USING VARIOUS ELUANTS

Resin: IRA-99, 6.0 g moist (2.42 g dry), loaded from solution No. 1; 5 cc resin/test.
Eluants: 1.5 g/l Ca(OH)$_2$ plus NaCNS, NaCl, NaCNS + NaCl; 500 ml/test.
Contact: Stirred in 800 ml beaker, 22/24° C., 1 hr.

| Eluant g/l | Sample | Assay, % | | | | | % Eluted | | | | |
|---|---|---|---|---|---|---|---|---|---|---|---|
| | | Zn | Ni | Co | Fe | Cu | Zn | Ni | Co | Fe | Cu |
| | Loaded resin | 0.85 | 0.71 | 0.77 | 0.19 | 0.65 | | | | | |
| 8.1 NaCNS | Treated resin | 0.22 | 0.036 | 0.18 | 0.12 | 0.016 | 74 | 95 | 77 | 37 | 98 |
| 32 NaCNS | Treated resin | 0.22 | 0.017 | 0.18 | 0.14 | 0.012 | 74 | 98 | 77 | 26 | 98 |
| 12 NaCl | Treated resin | 0.30 | 0.48 | 0.31 | 0.13 | 0.17 | 65 | 32 | 60 | 32 | 74 |
| 59 NaCl | Treated resin | 0.26 | 0.39 | 0.25 | 0.12 | 0.10 | 69 | 45 | 68 | 37 | 85 |
| 4.1 NaCNS + 12 NaCl | Treated resin | 0.22 | 0.081 | 0.25 | 0.14 | 0.026 | 74 | 89 | 68 | 26 | 96 |

EXAMPLE 2

Comparative data for resin loading of the IRA-35 and IRA-99 with feed solution No. 2 are shown in Table 3A. There was no significant difference in the fresh and ten cycle IRA-35 resins in loading or eluting characteristics, indicating no short-term degradation of the IRA-35 resin. No marked differences were found for the IRA-99 resin between the fresh and recycled resins. However, less than 5% of the ten cycle IRA-99 beads appeared to have changed somewhat in appearance, suggesting some physical degradation occurred. Comparisons of the 2-cycle and 10-cycle tests are presented in Table 3B.

TABLE 3A
Ten-Cycle Amberlite IRA-35/99 Resins - Solution No. 2 Stability Test

Conditions

| 1. Acidification | Resins | Amberlite IRA-35 and IRA-99, 20 × 50 mesh, 40 cc |
|---|---|---|
| | Column | 5 cm diam. |
| | H$_2$SO$_4$ soln | 0.10 $\underline{N}$ H$_2$SO$_4$, 500 ml |
| | Flow rate | 30 cc/min for Cycle 5, all others at 40 cc/min |
| | Temp | 22-24° C. |
| | Wash | H$_2$O, 300 ml |
| 2. Adsorption | Adsorption feed solution | spiked barren solution |

| | Assay, g/l | | |
|---|---|---|---|
| | As Received | Spiked to | Reagent |
| Cu | 0.24 | | |
| Zn | 0.085 | | |
| Fe | 0.05 | 0.089 | K$_4$Fe(CN)$_6$.3H$_2$O |
| Co | 0.001 | 0.10 | CoSO$_4$ + 6NaCN |
| Ni | 0.006 | 0.095 | NiSO$_4$ + 4NaCN |
| CNS | 0.34 | | |
| CN$^F$ | 0.20 | | |
| Cd | 0.001 | 0.11 | CdSO$_4$ + 4NaCN |

| 3. Elution | Eluant | 1.5 g/l Ca(OH)$_2$ + 4.1 g/l NaCNS + 1.0 g/l NaCN, 1600 ml |
|---|---|---|
| | Wash | H$_2$O, 300 ml |

Resin elution processes using a number of eluants were compared. Test conditions and results are presented in Table 3C.

| | Results: Cycles 1-9 | | | | | | | | | | |
|---|---|---|---|---|---|---|---|---|---|---|---|
| Cycle | 1 | | 2 | | 3 | | 5 | | 7 | | 9 |
| Resin IRA- | 35 | 99 | 35 | 99 | 35 | 99 | 35 | 99 | 35 | 99 | 35 | 99 |
| Acidification H$_2$SO$_4$ consumed, meq. | 41.1 | 32.2 | 37.2 | 29.5 | (27) | 37.5 | 38.3 | 33.1 | 34.7 | 36.7 | 37.4 | 34.0 |
| Adsorption Adsorbed, meq. | | | | | | | | | | | | |
| Cu | | | | | | | 6.55 | 6.34 | | | | |
| Zn | | | | | | | 3.21 | 2.81 | | | | |
| Ni | | | | | | | 3.28 | 2.97 | | | | |
| Co | | | | | | | 6.93 | 5.53 | | | | |
| Cd | | | | | | | 2.03 | 2.25 | | | | |
| Fe | | | | | | | 6.90 | 5.38 | | | | |
| CNS | | | | | | | 0.92 | 1.7 | | | | |
| Total cations | | | | | | | 28.9 | 25.3 | | | | |
| Elution Eluted, meq. | | | | | | | | | | | | |
| Cu | 6.64 | 6.76 | 6.58 | 6.13 | 6.63 | 5.88 | 6.51 | 6.43 | 6.19 | 5.93 | 5.74 | 6.08 |
| Zn | 2.91 | 2.29 | 3.30 | 2.59 | 3.26 | 2.92 | 3.54 | 3.10 | 2.95 | 2.76 | 3.21 | 3.09 |
| Ni | 3.05 | 3.76 | 3.21 | 2.84 | 2.96 | 2.69 | 3.20 | 2.88 | 2.91 | 2.65 | 2.91 | 2.82 |
| Co | 6.76 | 5.08 | 7.33 | 4.69 | 5.87 | 4.10 | 6.61 | 4.72 | 6.24 | 4.47 | 5.87 | 4.28 |
| Cd | 1.56 | 1.42 | 1.64 | 1.68 | 1.70 | 1.82 | 1.85 | 1.95 | 1.67 | 1.76 | 1.71 | 1.92 |
| Fe | 6.12 | 4.61 | 6.88 | 4.40 | (6.4) | (4.6) | 7.15 | 5.59 | 6.35 | 4.89 | 6.82 | 5.40 |
| Total cations | 27.0 | 22.9 | 29.0 | 22.3 | 27 | 22 | 28.9 | 24.7 | 26.3 | 22.5 | 26.3 | 23.6 |

TABLE 3A-continued

| Ten-Cycle Amberlite IRA-35/99 Resins - Solution No. 2 Stability Test | | | | | | | | |
|---|---|---|---|---|---|---|---|---|
| Base consumed, meq. | 34 | 26 | 34 | 31 | 30 | 28 | 36 | 29 |

TABLE 3B

| Volume BV | Cu 2 Cycle | Cu 10 Cycle | Zn 2 Cycle | Zn 10 Cycle | Cd 2 Cycle | Cd 10 Cycle | Ni 2 Cycle | Ni 10 Cycle | Co 2 Cycle | Co 10 Cycle | Fe 2 Cycle | Fe 10 Cycle | CNS 2 Cycle | CNS 10 Cycle | pH 2 Cycle | pH 10 Cycle |
|---|---|---|---|---|---|---|---|---|---|---|---|---|---|---|---|---|
| | | | | | Comparison of Ten-Cycle to Two-Cycle Amberlite-35 Resin, Adsorption Data | | | | | | | | | | | |
| | Resin Feed soln No. 2 | | | | | | | | | | | | Flow rate 7 ml/min Temperature 23° C. | | | |
| | | | | | | | Effluent assays, g/l | | | | | | | | | |
| 6 | <0.0001 | <0.0001 | 0.0005 | 0.0004 | 0.011 | 0.012 | 0.0001 | 0.0001 | <0.0001 | <0.0001 | <0.0001 | <0.0001 | 0.0026 | <0.002 | | |
| 12 | <0.0001 | <0.0001 | 0.0002 | 0.0003 | 0.021 | 0.022 | <0.0001 | <0.0001 | <0.0001 | <0.0001 | <0.0001 | <0.0001 | 0.026 | 0.032 | | |
| 21 | <0.0001 | <0.0001 | 0.0003 | 0.0003 | 0.027 | 0.022 | <0.0001 | <0.0001 | <0.0001 | <0.0001 | 0.0002 | 0.0002 | 0.46 | 0.48 | | |
| 29 | 0.054 | 0.051 | 0.0002 | 0.0003 | 0.060 | 0.061 | 0.0080 | 0.0095 | 0.013 | 0.013 | 0.0002 | 0.0015 | 0.52 | 0.54 | | |
| 41 | 0.56 | 0.57 | 0.0004 | 0.0004 | 0.13 | 0.13 | 0.15 | 0.15 | 0.10 | 0.10 | 0.0040 | 0.0015 | 0.34 | 0.33 | | |
| 47 | 0.50 | 0.50 | 0.0008 | 0.0007 | 0.14 | 0.14 | 0.17 | 0.18 | 0.099 | 0.98 | 0.049 | 0.025 | 0.33 | 0.34 | | |
| | | | | | Comparison of Ten-Cycle to Two-Cycle Amberlite IRA-99 Resin, Elution Data | | | | | | | | | | | |
| | Resin Eluant | | | | 1.5 g/l Ca(OH)$_2$ + 4.1 g/l NaCNS + 1.0 g/l NaCN | | | | | | | | | | | |
| | | | | | | | Eluate assays, g/l | | | | | | | | | |
| 6 | 0.69 | | 0.021 | 0.038 | 0.20 | 0.23 | 0.27 | | 0.17 | 0.16 | 0.24 | 0.23 | 2.30 | 2.42 | 8.4 | 8.3 |
| 15 | 0.15 | | 0.35 | 0.35 | 0.37 | 0.36 | 0.16 | | 0.13 | 0.12 | 0.18 | 0.18 | 2.93 | 2.93 | 11.2 | 11.5 |
| 24 | 0.0075 | | 0.13 | 0.074 | 0.077 | 0.054 | 0.0097 | | 0.023 | 0.014 | 0.029 | 0.021 | 2.68 | 2.53 | 12.5 | 12.6 |
| 36 | 0.0009 | | 0.0086 | 0.0050 | 0.014 | 0.011 | 0.0006 | | 0.0021 | 0.0022 | 0.0012 | 0.0014 | 2.85 | 2.82 | 12.6 | 12.6 |
| 48 | 0.0005 | | 0.0031 | 0.0016 | 0.0084 | 0.0055 | 0.0002 | | 0.0013 | 0.0014 | 0.0006 | 0.0012 | 2.82 | 2.81 | 12.6 | 12.6 |
| Resin wt % | 0.005 | | 0.015 | 0.004 | 0.076 | 0.069 | 0.005 | | 0.14 | 0.18 | 0.037 | 0.051 | | | | |
| | | | | | Comparison of Ten-Cycle to Two-Cycle Amberlite IRA-99 Resin, Adsorption Data | | | | | | | | | | | |
| | Resin Feed soln No. 2 | | | | 1.5 g/l Ca(OH)$_2$ 20 × 50 mesh Acidified with 0.1 N H$_2$SO$_4$; 30 cc | | | | | | | | | | | |
| | | | | | | | Effluent assays, g/l | | | | | | | | | |
| 6 | <0.0001 | <0.0001 | 0.0005 | 0.0013 | 0.0039 | 0.0042 | <0.0001 | <0.0001 | <0.0001 | <0.0001 | 0.0002 | 0.0002 | 0.256 | 0.127 | | |
| 12 | <0.0001 | <0.0001 | <0.0001 | <0.0001 | 0.0009 | 0.0008 | <0.0001 | <0.0001 | <0.0001 | <0.0001 | 0.0002 | 0.0005 | 0.180 | 0.116 | | |
| 21 | 0.0002 | 0.0010 | <0.0001 | <0.0001 | 0.0013 | 0.0008 | 0.0076 | 0.0042 | 0.0002 | 0.0009 | 0.0002 | 0.0095 | 0.039 | 0.047 | | |
| 29 | 0.014 | 0.024 | <0.0002 | <0.0002 | 0.0015 | 0.0006 | 0.028 | 0.032 | 0.28 | 0.50 | 0.0059 | 0.039 | 0.500 | 0.47 | | |
| 41 | 0.23 | 0.29 | 0.0004 | 0.0004 | 0.0079 | 0.0043 | 0.046 | 0.032 | 0.23 | 0.28 | 0.032 | 0.039 | 1.03 | 0.85 | | |
| 47 | 0.36 | 0.38 | 0.0004 | 0.0004 | 0.012 | 0.0094 | 0.073 | 0.057 | 0.36 | 0.39 | 0.049 | 0.050 | 0.66 | 0.564 | | |
| | | | | | Comparison of Ten-Cycle to Two-Cycle Amberlite IRA-99 Resin Elution Data | | | | | | | | | | | |
| | Resin Eluant | | | | 1.5 g/l Ca(OH)$_2$ + 4.1 g/l NaCNS + 1.0 g/l NaCN | | | | | | | | | | | |
| | | | | | | | Eluate assays, g/l | | | | | | | | | |
| 6 | 0.75 | 0.69 | 0.021 | 0.038 | 0.20 | 0.23 | 0.27 | | 0.17 | 0.16 | 0.24 | 0.23 | 2.30 | 2.42 | 8.4 | 8.3 |
| 15 | 0.19 | 0.15 | 0.35 | 0.35 | 0.37 | 0.36 | 0.16 | | 0.13 | 0.12 | 0.18 | 0.18 | 2.93 | 2.93 | 11.2 | 11.5 |
| 24 | 0.010 | 0.0075 | 0.13 | 0.074 | 0.077 | 0.054 | 0.0097 | | 0.023 | 0.014 | 0.029 | 0.021 | 2.68 | 2.53 | 12.5 | 12.6 |
| 36 | 0.0009 | 0.0009 | 0.0086 | 0.0050 | 0.014 | 0.011 | 0.0006 | | 0.0013 | 0.0022 | 0.0006 | 0.0014 | 2.85 | 2.82 | 12.6 | 12.6 |
| 48 | 0.0005 | 0.0005 | 0.0031 | 0.0016 | 0.0084 | 0.0055 | 0.0002 | | 0.14 | 0.0014 | 0.0006 | 0.0012 | 2.82 | 2.81 | 12.6 | 12.6 |
| Resin wt % | <0.005 | <0.005 | 0.015 | 0.004 | 0.076 | 0.069 | <0.005 | | | 0.18 | 0.037 | 0.051 | | | | |

TABLE 3C
RESIN ELUTION USING VARIOUS ELUANTS

Resin     IRA-99, 12 g moist (4.7 g dry), loaded from solution No. 2, 10 cc resin/test
Eluants    1.5 g/l $Ca(OH)_2$ plus NaCNS, NaCNS + NaCN
Contact   First stirred with 1.0 L eluant in beaker for 30 min at 23° C., then transferred resin to
            ½" column and eluted with 150–250 ml eluant until effluent assayed 0.01 g/l Zn.

| Test | Eluant g/l | Sample | Assay, % Zn | Ni | Co | Fe | Cu | % Eluted Zn | Ni | Co | Fe | Cu |
|---|---|---|---|---|---|---|---|---|---|---|---|---|
|  |  | Loaded resin | 0.85 | 0.71 | 0.77 | 0.19 | 0.65 |  |  |  |  |  |
| 1 | 8.1 NaCNS | Treated resin | 0.070 | 0.004 | 0.20 | 0.13 | 0.005 | 92 | 99+ | 74 | 32 | 99+ |
| 2 | 8.1 NaCNS + 5.0 NaCN | Treated resin | 0.016 | 0.006 | 0.17 | 0.080 | 0.002 | 98 | 99+ | 87 | 58 | 99+ |

EXAMPLE 3

A test was performed to produce a concentrated eluate by recycling a saturated $Ca(OH)_2$ solution through the resin. 200 cc of IRA-35 resin in a 2.6 cm diameter column was acidified with $H_2SO_4$, loaded with solution No. 3 and then eluted by recycling a saturated $Ca(OH)_2$ solution containing NaCN through the resin. This cycle was repeated twice. Process conditions and results are presented in Table 4A.

Resin elution processes using a number of eluants were compared. Test conditions and results are presented in Table 4B.

TABLE 4A
Adsorption and Elution Data for Amberlite IRA-35 Resin

Cycle 1

| 1. Acidification | Resin | Amberlite IRA-35, 20 × 50 mesh, 200 cc WSR |
|---|---|---|
|  | Column | 2.6 cm diam × 37 cm |
|  | $H_2SO_4$ soln | 19.3 g/l $H_2SO_4$, 490 ml (193 meq) |
|  | Flow rate | 20 ml/min |
|  | $H_2SO_4$ adsorbed | 9.46 g, 193 meq |
|  | Temperature | 23° C. |
| 2. Adsorption | Feed solution | No. 3 |
|  | Flow rate | 22 ml/min (6.6 BV/hr, 1.0 gpm/ft²), downflow |

| Assays Sample | Volume (cum) ml | BV | Assay, g/l $CN^T$ | $CN^F$ | CNS | Cu | Zn | Fe | Ni | pH |
|---|---|---|---|---|---|---|---|---|---|---|
| Feed Solution | 4000 |  | 1.05 | 0.56 | 0.34 | 0.49 | 0.091 | 0.046 | 0.0064 | 10.5 |
| Effluent |  |  |  |  |  |  |  |  |  |  |
| 1 | 910 | 4.6 |  | 0.26 | 0.002 | <0.0002 | 0.0002 | 0.0003 | <0.0002 | 9.2 |
| 2 | 2165 | 10.8 |  | 0.24 | 0.013 | <0.0002 | 0.0002 | 0.0003 | <0.0002 | 9.0 |
| 3 | 3375 | 16.9 |  | 0.24 | 0.43 | <0.0002 | 0.0002 | <0.0003 | <0.0002 | 8.9 |
| 4 | 3840 | 19.2 |  | 0.24 | 0.57 | <0.0002 | 0.0002 | <0.0003 | <0.0002 | 8.9 |
| Adsorbed, |  |  |  |  |  |  |  |  |  |  |
| g |  |  | 3.24 |  | ~0.78 | 1.95 | 0.364 | 0.18 | 0.026 |  |
| meq |  |  |  |  | ~13 | 61.5 | 11.1 | 13.0 | 0.8 (Total = 99) |  |
| g/l |  |  |  |  | 3.9 | 9.75 | 1.82 | 0.90 | 0.13 |  |
| lb/ft³ |  |  | 1.01 |  | 0.24 | 0.61 | 0.11 | 0.056 | 0.0081 |  |

| 3. Elution | Eluant, recycle | 130 ml $H_2O$ + 8.0 g $Ca(OH)_2$ + 2.32 g NaCN (contained in 200 ml beaker, and equipped with 2 glass frits through which solution was filtered), solution recycled through resin at 22 ml/min until pH ~ 12. |
|---|---|---|
|  | flush | Saturated $Ca(OH)_2$ + 5.7 g/l NaCn, 1000 ml used to flush pregnant eluate from column at 22 ml/min |
|  | Temperature | 28/30° C. |

| Assays Sample | Volume ml | BV (Cum) | pH | Assay, g/l $CN^T$ | $CN^F$ | CNS | Cu | Zn | Fe | Ni |
|---|---|---|---|---|---|---|---|---|---|---|
| Eluate |  |  |  |  |  |  |  |  |  |  |
| 1 | 140 | 0.7 | 12+ | 16.5 | 7.7 | 2.08 | 6.75 | 0.30 | 0.64 | 0.039 |
| 2 | 100 | 1.2 | 12.2 | 13.2 | 8.2 | 1.96 | 6.82 | 0.29 | 0.62 | 0.035 |
| 3 | 100 | 1.7 | 12.2 | 6.4 | 5.6 | 2.02 | 2.11 | 0.38 | 0.12 | 0.047 |
| Flush eluate |  |  |  |  |  |  |  |  |  |  |
| 1 | 100 | 2.2 | 12.3 | 4.4 | 4.5 | 1.31 | 0.28 | 0.38 | 0.019 | 0.038 |
| 2 | 100 | 2.7 | 12.4 | 3.8 | 4.1 | 0.38 | 0.052 | 0.33 | 0.004 | 0.027 |
| 3 | 100 | 3.2 | 12.4 |  | 4.1 | 0.13 | 0.020 | 0.32 | 0.002 | 0.019 |
| 4 | 100 | 3.7 | 12.4 |  | 4.1 | 0.03 | 0.008 | 0.31 | 0.001 | 0.012 |
| 5 | 100 | 4.2 | 12.4 |  | 4.1 | 0.01 | 0.004 | 0.28 | <0.001 | 0.007 |
| 6 | 100 | 4.7 | 12.4 |  | 4.1 | 0.005 | 0.001 | 0.22 | <0.001 | 0.004 |
| 7 | 100 | 5.2 | 12.4 |  |  |  |  | 0.17 |  |  |
| 9 | 100 | 6.2 |  |  |  |  |  | 0.11 |  |  |
| Residual $Ca(OH)_2$ |  | 3.05 g |  |  |  |  |  |  |  |  |
| Eluted, g |  |  |  |  | 3.8 | 0.87 | 1.87 | 0.36 | 0.166 | 0.024 |

Cycle 2
1. Acidification    Same as Cycle 1
     $H_2SO_4$ adsorbed   9.85 g, 201 meq.

TABLE 4A-continued

Adsorption and Elution Data for Amberlite IRA-35 Resin

2. Adsorption Assays — Same as Cycle 1

| Sample | Volume (Cum) ml | BV | pH | $CN^T$ | $CN^F$ | CNS | Cu | Zn | Fe | Ni | CNO | S" | ppm Au |
|---|---|---|---|---|---|---|---|---|---|---|---|---|---|
| Feed soln | 4000 | | 10.6 | 1.10 | 0.51 | 0.35 | 0.488 | 0.089 | 0.047 | 0.0065 | 0.063 | 0.01 | 0.09 |
| Effluent | | | | | | | | | | | | | |
| 1 | 913 | 4.6 | 9.6 | | 0.21 | 0.004 | <0.0002 | 0.0003 | <0.0002 | <0.0002 | | | |
| 2 | 2217 | 11.1 | 9.2 | | 0.24 | 0.024 | <0.0002 | 0.0002 | <0.0002 | <0.0002 | 0.044[1] | <0.01[1] | <0.002[1] |
| 3 | 3434 | 17.2 | 9.2 | | 0.24 | 0.22 | <0.0002 | <0.0002 | <0.0002 | <0.0002 | | | |
| 4 | 3852 | 19.3 | 9.1 | | 0.25 | 0.57 | <0.0002 | <0.0002 | <0.0002 | <0.0002 | | | |
| Adsorbed, | | | | | | | | | | | | | |
| g | | | | 3.24 | | 1.05 | 1.95 | 0.356 | 0.188 | 0.026 | | | |
| lb/ft³ | | | | 1.01 | | 0.327 | 0.608 | 0.111 | 0.059 | 0.0081 | | | |

[1] Composite of effluent 1, 2, 3, 4.

3. Elution, recycle  Solution in resin displaced with Cycle 1 pregnant eluates (330 ml) + 8.0 g Ca(OH)₂ recycled for 2½ hours until pH = 11.5 plus ½ hour longer at 22 ml/min.
Temperature = 25-28° C.
flush  Saturated Ca(OH)₂ (200 ml) + H₂O (100 ml) at 22 ml/min, 23° C.

| Assays Sample | Vol ml | $CN^T$ | $CN^C$[3] | Cu | Zn | Fe | Ni | CNS | Ca(OH)₂ | Ca | Co | Au | SO₄ |
|---|---|---|---|---|---|---|---|---|---|---|---|---|---|
| Eluant recycle | 230 | 14.9 | | 6.65 | 0.300 | 0.617 | 0.038 | 2.03 | | | | | |
| Eluate | | | | | | | | | | | | | |
| 1 | 145 | 22.0 | 17.4 | 11.0 | 0.51 | 1.07 | 0.051 | 2.72 | | | | | |
| 2 | 100 | 22.0 | 17.0 | 10.8 | 0.50 | 1.02 | 0.049 | 2.71 | | | | 0.0002 | |
| 3 | 100 | 8.3 | 8.2 | 5.25 | 0.62 | 0.23 | 0.055 | 2.54 | | | | | |
| 4 | 100 | 3.3 | 2.9 | 1.42 | 0.61 | 0.040 | 0.047 | 1.66 | | | | | |
| Resin | 42 g | 0.32 | | 0.031 | 0.40 | <0.003 | 0.016 | (<0.5) | | | 0.017 | | |
| Residual Ca(OH)₂ | 3.98 g | 3.4 | | 2.3 | 0.26 | 0.32 | <0.01 | | 32 | 29.5 | | | 28 |

[3] $CN^C$ = CN calculated as metal complexes.
[4] Solutions as g/l, solids as %.

Material balance:

| | Amount, g | | | | | |
|---|---|---|---|---|---|---|
| | $CN^T$ | Cu | Zn | Fe | Ni | CNS |
| Input, | | | | | | |
| resin | 3.24 | 1.95 | 0.356 | 0.188 | 0.026 | 1.05 |
| eluant | 3.42 | 1.53 | 0.069 | 0.142 | 0.0086 | 0.47 |
| total | 6.66 | 3.48 | 0.425 | 0.330 | 0.035 | 1.52 |
| Output eluant | 6.55 | 3.34 | 0.247 | 0.284 | 0.022 | 1.08 |
| Ca(OH)₂ | 0.13 | 0.092 | 0.010 | 0.013 | <0.001 | NA |
| Resin | 0.13 | 0.013 | 0.168 | <0.001 | 0.007 | <0.2 |
| Total | 6.81 | 3.45 | 0.425 | 0.297 | 0.029 | |
| % eluted | 98.1 | 99.6 | 60 | 99+ | 76 | >82 |

Ca(OH)₂ consumption Feed  8.00 g × 95% = 7.60 g Ca(OH)₂
Excess = 1.27
Soluble ~ 0.5 L × 1.5 g/l = 0.75
Consumed 5.58 (= 151 meq)

TABLE 4B

RESIN ELUTION TESTS USING VARIOUS ELUANTS

| Resin | IRA-35, from 2nd cycle elution |
|---|---|
| | Assay (in %, dry) = 0.44 Zn, 0.031 Cu, 0.016 Ni, 0.017 Co, 0.001 Fe (filtered, H₂O washed) |
| | Amount/test = 20 cc WSR (4.1 g dry) |
| Eluant | |
| Assay (in g/l) | Test 1  8.1 NaCNS + 4.0 NaOH |
| | 2  8.1 NaCNS + 12 NaOH |
| | 3  8.1 NaCNS + 4.9 NaCNS + 4.0 NaOH |
| | 4  4.1 NaCNS + 4.0 NaOH |
| | 5  1.0 NaCNS + 4.0 NaOH |
| | 6  8.4 NaHCO₃ (after H₂O flush) |
| | 7  8.4 NaHCO₃ + 0.9 NaCN (after H₂O flush) |
| Volume | 200 ml/test |
| Flow Rate | 2 ml/min |
| Temperature | 22/24° C. |
| Samples, | |
| eluate | 20 ml fractions |
| resin | Final resin filtered and dried for assay |

TABLE 4B-continued

RESIN ELUTION TESTS USING VARIOUS ELUANTS

| Test No. | 1 | 2 | 3 | 4 | 5 | 6 | 7 |
|---|---|---|---|---|---|---|---|
| | 8.1 NaCNS | 8.1 NaCNS | 8.1 NaCNS | 4.1 NaCNS | 1.0 NaCNS | 8.4 NaHCO$_3$ | 8.4 NaHCO$_3$ |
| | 4.0 NaOH | 12 NaOH | 4.9 NaCN | 4.0 NaOH | 4.0 NaOH | | 0.9 NaCN |
| | | | 4.0 NaOH | | | | |
| Eluate | | | | | | | |
| 1, mg/L Zn | 78 | 153 | 73 | 123 | 61 | 33 | 43 |
| 2, mg/L Zn | 189 | 207 | 131 | 198 | 258 | 25 | 24 |
| 3, mg/L Zn | 36 | 19 | 93 | 50 | 50 | 18 | 8.9 |
| 4, mg/L Zn | 4.5 | 4.5 | 49 | 7.3 | 6.0 | 14 | 2.4 |
| 5, mg/L Zn | 1.2 | 1.8 | .22 | 2.1 | 1.7 | 10 | 1.9 |
| Resin, % Zn | <0.01 | <0.01 | <0.01 | <0.01 | <0.01 | 0.03 | 0.11 |
| Zn eluted, | | | | | | | |
| mg | 6.17 | 7.71 | 7.36 | 7.61 | 7.52 | 2.02 | 1.59 |
| % | 98+ | 98+ | 98+ | 98+ | 98+ | 95 | 75 |

EXAMPLE 4

A synthetic feed solution prepared from Na$_2$Cu(CN)$_3$ having 0.5 to 0.6 grams per liter Cu at pH 10.2 was downflowed through a 5 cm diameter by 2 cm resin bed at 30 to 40 ml per minute and 22° to 24° C. The resin used was XE-299 (Amberlite IRA-99 equivalent), 15xMesh, 40 cc WSR (capacity equal 1.2 meq/L). Procedures and results are presented in Table 5A.

Resin elution processes using a number of eluants were compared. Test conditions and results are presented in Table 5B.

TABLE 5A

Resin Stability Test

| | | Solution, g/l | Vol, ml |
|---|---|---|---|
| 1. | Acidification | 4.8 H$_2$SO$_4$ | 500 |
| | Flush | H$_2$O | 300 |
| 2. | Adsorption | Feed solution | 2600 |
| 3. | Elution | 1.5 Ca(OH)$_2$ + 1.0 NaCN | 1600 |
| | Flush | H$_2$O | 200 |

| Data summary Cycle | 1 | 2 | 3 | 4 | 5 | Total |
|---|---|---|---|---|---|---|
| Feed solution, g/l Cu | 0.59 | 0.48 | 0.48 | 0.56 | 0.58 | |
| Cu adsorbed, g | 1.28 | 1.04 | 1.06 | 1.09 | 1.12 | 5.59 |
| Cu eluted, g | 1.06 | 1.01 | 1.02 | 1.01 | 1.10 | 5.20 |
| Ratio, CN$^T$/Cu[1] | 1.06 | 1.17 | | | 1.13 | |
| Acid/base consumed, meq/ml | | | | | | |
| H$_2$SO$_4$ | 1.03 | 1.02 | | | 0.93 | |
| Ca(OH)$_2$ | 0.93 | 0.93 | | | 0.93 | |
| Final resin, | | | | | | |
| % Cu | | | | | 1.55 | |
| g Cu | | | | | 0.20 | 0.20 |
| Resin loading | 28 g Cu/l, 34 g CN$^T$/l (2.1 lb CN$^T$/ft$^3$) (0.88 meq/l) | | | | | |

[1] Ratio of g NET CN$^T$ in eluate/g Cu in eluate (MR 3CN/Cu = 1.23).

TABLE 5B

Weak-base Resin Elution Scoping Tests

Resin   IRA-99, 4.4 g moist, loaded using barren MC solution and eluted with saturated Ca(OH)$_2$ + 5 g/l CN, then 20 g/l NaOH
Eluants   NaCNS + NaOH, NH$_4$OH, NaOH + NaCl, NaCN + NaOH
Contact   Percolated eluants (100 ml) through resins in gooch crucibles at 1-3 ml/min in 10-20 ml portions.

| | | | Assay, % | | | % Eluted | | |
|---|---|---|---|---|---|---|---|---|
| Test | Eluant g/l | Sample | Zn | Fe | Cu | Zn | Fe | Cu |
| | | Feed resin | 0.40 | 0.20 | 0.040 | | | |
| 1 | 81 NaCNS + 4 NaOH | Treated resin | 0.030 | 0.17 | 0.014 | 93 | 15 | 65 |
| 2 | 3.5 N NH$_4$OH | Treated resin | 0.34 | 0.20 | 0.040 | 15 | <10 | <10 |
| 3 | 40 NaOH + 58 NaCl | Treated resin | 0.020 | 0.17 | 0.030 | 95 | 15 | 25 |
| 4 | 49 NaCN + 40 NaOH | Treated resin | 0.38 | 0.20 | 0.019 | <10 | <10 | 53 |

EXAMPLE 5

Acidification/volatilization tests were run on eluates from a weak base ion exchange process. The resin was eluted with Ca(OH)$_2$. The feed solutions for these tests have the assays shown in Table 8. Feed Solution 1 is a synthetic feed prepared with NaCN, CuCN, ZnSO$_4$ and K$_4$Fe(CN)$_6$. Feed solutions 2 and 3 are ion exchange eluates from the elution of Amberlite IRA-99 with Ca(OH)$_2$ and NaCN spiked with NaCNS, K$_4$Fe(CN)$_6$ and ZnSO$_4$+4NaCN. Feed solutions 4 and 5 are synthetic solutions prepared with NaCN, CuCN, NaCNS, K$_4$Fe(CN)$_6$, and ZnSO$_4$+4NaCN. Feed Solutions 6-13 are synthetic solutions simulating ion exchange resin eluates obtainable from the elution of weak base resins with calcium hydroxide.

In Tests 1-7, 200 grams per liter H$_2$SO$_4$ was added gradually to the feed solution contained in a 250 ml distillation flask under 4 to 5 inches mercury vacuum with 70 to 90 cc/min air sparge. Tests 8 and 9 were identical except that the feed solution was added gradually to 200 grams per liter H$_2$SO$_4$ in the distillation flask.

In Tests 10-17 100 ml of synthetic solution was added at 1 ml/min to 30 to 54 ml of 200 grams per liter H$_2$SO$_4$ (plus 5 grams CaSO$_4$ to H$_2$O) contained in a 250 ml distillation flask. Air was sparged into the slurry at about 80 cc/min.

Cyanide recoveries of 75-87% were obtained in two hours at 55°-60° C., 5 in. Hg vacuum, and 30-40 g/l H$_2$SO$_4$ acidity. Increasing the temperature to 89° C. increased cyanide recovery to 90%.

Results for Tests 1 and 2 are presented in Table 9. Results for Tests 3-9 are presented in Table 10. Results for Tests 10-17 are presented in Table 11.

TABLE 8

Feed Solution Assays

| Feed solution | 1 | 2 | 3 | 4 | 5 | 6 | 7 |
|---|---|---|---|---|---|---|---|
| Feed solution assay, g/l | | | | | | | |
| $CN^T$ | 30.5 | 33.6 | 31.6 | 33.6 | 34.5 | 33.8 | 33.6 |
| CNS | 5.6 | 6.6 | 13.0 | 17.0 | 5.1 | 5.2 | 5.3 |
| Cu | 15.8 | 16.3 | 16.5 | 15.9 | 17.1 | 15.3 | 14.5 |
| Zn | 2.21 | 2.94 | 2.98 | 3.42 | 3.60 | 3.57 | 3.45 |
| Fe | 0.84 | 1.56 | 1.55 | 1.58 | 1.64 | 1.82 | 1.75 |

| Feed Solution | 8 | 9 | 10 | 11 | 12 | 13 |
|---|---|---|---|---|---|---|
| Feed solution assay, g/l | | | | | | |
| $CN^T$ | 36.5 | 38.1 | 38.1 | 33.6 | 33.6 | 33.6 |
| CNS | 5.2 | 6.1 | 10.4 | 5.1 | 5.3 | 9.8 |
| Cu | 6.90 | 6.70 | 7.35 | 14.5 | 15.0 | 14.8 |
| Zn | 10.3 | 5.10 | 5.50 | 3.62 | 3.63 | 3.57 |
| Fe | 1.93 | 5.49 | 5.13 | 1.79 | 1.93 | 1.92 |

TABLE 9

Summary of HCN Volatilization Tests

| Test | 1 | 2 |
|---|---|---|
| Feed solution | 1 | 1 |
| $H_2SO_4$ added, g/g $CN^T$ | 2.7 | |
| Additive | | $Fe_2(SO_4)_3$[1] |
| g/g $CN^T$ | | 1.8 |
| Temperature, °C. | 65 | 52 |
| Time, min | | |
| $H_2SO_4$ addn. | 99 | 81 |
| Total | 99 | 81 |
| % evolved, | | |
| CN | 77 | → 92 |
| CNS | 1 | <5 |
| Precipitate assay, % | | |
| $CN^T$ | 20 | 15.4 |
| CNS | 14 | 31.0 |
| Cu | 49.1 | 43.8 |
| Fe | 3.58 | 4.95 |
| Zn | 2.38 | 0.11 |
| Solution assay, g/l | | |
| $CN^T$ | 0.27 | 0.11 |
| CNS | <0.01 | 0.02 |
| Cu | 0.046 | 7.25 |
| Fe | 0.026 | 11.1 |
| Zn | 0.76 | 1.76 |
| $H_2SO_4$ | 29 | 24 |
| % precipitated | | |
| $CN^T$ | 22 | 7 |
| CNS | 99 | 98 |
| Cu | 99+ | 45 |
| Fe | 96 | |
| Zn | 52 | 1 |

[1]Tested the effect of adding $Fe_2(SO_4)_3$ to residual acid slurry after initial HCN was evolved.

TABLE 10

| Test | 3 | 4 | 5 | 6 | 7 | 8 | 9 |
|---|---|---|---|---|---|---|---|
| Feed solution | 2 | 3 | 4 | 5 | 5 | 5 | |
| $H_2SO_4$ added, g/g $CN^T$ | 2.6 | 3.1 | 3.2 | 3.2 | 3.2 | 3.2 | |
| Additive | | | | | 79 g/l NaCl | | |
| Temperature, °C. | 58 | 58 | 58 | 58 | 58 | 58 | → 91 |
| Time, min | | | | | | | |
| $H_2SO_4$ addn. | 77 | 123 | 93 | 83 | 107 | (122) | |
| Total | 115 | 190 | 152 | 144 | 152 | 204 | 67 |
| % evolved, | | | | | | | |
| CN | 75 | 83 | 87 | 71 | 73 | 74 | → 80 |
| CNS | <5 | <5 | <5 | <5 | <5 | <5 | <5 |
| $H_2SO_4$ consumed, g/g $CN^1$ | 1.7 | 1.8 | 1.8 | 1.7 | 1.7 | 1.7 | 1.7 |
| Precipitate assay, % | | | | | | | |
| $CN^T$ | | | | 10.3 | 8.0 | | 9.2 |
| CNS | | | | (4.4) | (5.5) | | (5.2) |
| Cu | | | | 18.6 | 21.6 | | 21.8 |
| Fe | | | | 1.83 | 1.92 | | 1.67 |
| Zn | | | | 2.46 | 2.00 | | 0.67 |
| Ca | | | | 13.1 | 14.2 | | 14.4 |
| Feed solution | 2 | 3 | 4 | 5 | 5 | 5 | |
| Solution assay, g/l | | | | | | | |
| $CN^T$ | 0.84 | 0.12 | 0.39 | 0.79 | 0.39 | 0.41 | 0.10 |
| CNS | <0.01 | <0.01 | 0.43 | <0.01 | <0.01 | <0.01 | <0.01 |
| Cu | 0.036 | 1.89 | 0.015 | 0.052 | 0.13 | 0.26 | 0.40 |
| Fe | <0.001 | 0.002 | 0.003 | 0.001 | 0.003 | 0.005 | 0.15 |
| Zn | 0.42 | 0.45 | 0.31 | 0.85 | 1.16 | 1.30 | 1.91 |
| $H_2SO_4$ | 30 | 34 | 36 | 43 | 46 | 42 | 42 |
| % precipitated | | | | | | | |
| CNS | 99+ | 99+ | 96 | 98+ | 99+ | 99+ | 99+ |
| Cu | 99+ | 85 | 99+ | 99+ | 98+ | 98 | 97 |
| Fe | 99+ | 99+ | 99+ | 99+ | 99+ | 99+ | 86 |
| Zn | 79 | 81 | 86 | 62 | 51 | 60 | 85 |

TABLE 11

| Test | 10 | 11 | 12 | 13 | 14 | 15 | 16 | 17 |
|---|---|---|---|---|---|---|---|---|
| Feed Solution | 6 | 7 | 8 | 9 | 10 | 11 | 12 | 13 |
| $H_2SO_4$ added, g/g $CN^T$ | 2.98 | 3.21 | 2.95 | 2.83 | 2.83 | 1.79 | 1.79 | 2.98 |
| Additive | $H_3PO_4$ | $Fe_2(SO_4)_3$ | | | | | | |
| g/g $CN^T$ | 0.15 | 1.0 | | | | | | |
| Temperature, °C. | 58 | 58 | 58 | 58 | 58 | 58 | 89 | 89 |
| Time, min | | | | | | | | |
| soln addn. | 100 | 99 | 96 | 90 | 87 | 78 | 87 | 79 |

TABLE 11-continued

| Test | 10 | 11 | 12 | 13 | 14 | 15 | 16 | 17 |
|---|---|---|---|---|---|---|---|---|
| Total | 160 | 169 | 172 | 155 | 167 | 158 | 128 | 129 |
| % evolved, | | | | | | | | |
| CN | 73.2 | 77.6 | 82.7 | 55 | 56 | 70.3 | 76.9 | 89.9 |
| CNS | <5 | <5 | <5 | <5 | <5 | <5 | <5 | <5 |
| Precipitate assay, % | | | | | | | | |
| $CN^T$ | 9.8 | 9.2 | 8.7 | 15.1 | 14.7 | 11.7 | 8.7 | 5.1 |
| $CNS^1$ | (5.4) | (6.6) | (5.8) | (1.9) | (2.8) | (5.5) | (5.6) | (12.0) |
| Cu | 18.0 | 15.7 | 9.95 | 8.40 | 8.00 | 17.7 | 19.2 | 21.3 |
| Fe | 2.22 | 2.86 | 2.60 | 6.05 | 5.75 | 2.16 | 1.90 | 1.15 |
| Zn | 1.46 | 0.021 | 3.40 | 5.85 | 5.95 | 2.70 | 1.79 | 0.34 |
| Ca | 14.2 | 15.1 | 16.3 | 13.2 | 11.3 | 13.5 | 1.41 | 15.8 |
| Solution assay, g/l | | | | | | | | |
| $CN^T$ | 0.36 | 0.32 | 0.29 | 0.28 | 0.25 | 0.27 | 0.06 | 0.07 |
| CNS | | <0.01 | <0.01 | 2.08 | 4.60 | <0.01 | <0.01 | <0.01 |
| Cu | 0.34 | 1.89 | 0.27 | <0.001 | <0.001 | 0.052 | 0.16 | 0.52 |
| Fe | 0.007 | 3.60 | 0.003 | 0.007 | 0.007 | 0.002 | 0.24 | 0.70 |
| Zn | 1.52 | 2.18 | 5.50 | <0.001 | <0.001 | 0.92 | 1.40 | 2.20 |
| $H_2SO_4$ | 41 | 39 | 35 | 46 | 47 | 11 | 8.2 | 30 |
| % precipitated | | | | | | | | |
| CNS | 97 | 98 | 99 | 36 | 28 | 98 | 98 | 99 |
| Cu | 96.5 | 79.4 | 94.2 | 99.9 | 99.9+ | 99.5 | 98.6 | 95.3 |
| Fe | 99.4 | | 99.7 | 99.9 | 99.8 | 99.9 | 83.0 | 45.2 |
| Zn | 33.1 | 0.4 | 21.6 | 99.9 | 99.9 | 64.3 | 43.7 | 7.2 |

[1] CNS assays of precipitates are probably low by 10–20%.

EXAMPLE 7

An ion exchange eluate prepared by eluting Amberlite IRA-35 with $Ca(OH)_2/CN$ was gradually added to 50 ml 116 grams per liter $H_2SO_4$ solution at 70° to 80° C. Air sparge at about 0.5 cfm/ft³ solution was conducted. The results are presented in Table 12.

TABLE 12

| | Assays | | | |
|---|---|---|---|---|
| | Ion-Exchange Eluate g/l | Scrub Soln[1] g/l | Final Soln g/l | Precipitate[3] g/l |
| $CN^T$ | 22.0 | 1.98 | 0.06 | 7.75 |
| CNS | 2.03 | <0.01 | <0.01 | 3.3 |
| Cu | 10.9 | | 0.96 | 14.7 |
| Zn | 0.60 | | 0.38 | 0.048 |
| Fe | 1.16 | | 0.13 | 1.46 |
| Ni | 0.051 | | 0.032 | 0.005 |
| Co | 0.019 | | <0.0005 | 0.028 |
| Ca | 12.0 | | | 15.9 |
| $H_2SO_4$ | | | 17.2 | |
| | Distribution, % | | | |
| | | Scrub Soln | Final Soln | Precipitate |
| $CN^T$ | | 78.0 | 0.4 | 21.6 |
| CNS | | <6 | <1 | 93+ |
| Cu | | | 13 | 87 |
| Zn | | | 95 | 5 |
| Fe | | | 18 | 82 |
| Ni | | | 94 | 6 |
| Co | | | <5 | 95+ |
| $H_2SO_4$ | | | | |
| added | 2.69 g/g $CN^T$ | | | |
| consumed | 1.84 g/g CN evolved | | | |
| Precipitate composition | $CaSO_4.2H_2O$ + probable $Cu_2Fe(CN)_6$, $2CuCNS.CuCn$ | | | |

[1] Large volumes of NaOH scrub solutions were used. More concentrated solutions can be obtained in actual practice.
[2] Higher temperatures resulted in excessive frothing.
[3] Precipitate = 6.25 g.

Although the foregoing invention has been described in detail and by way of example for purposes of clarity and understanding, as will be known and understood by those skilled in the art, changes and modifications may be made without departing from the spirit of the invention which is limited only by the scope of the appended claims.

What is claimed is:

1. A method of treating waste streams containing free cyanide and cyanide complexes comprising:
   concentrating cyanide complexes using weak base ion exchange resin;
   eluting the resin with a recycled saturated lime solution to form an eluate having a concentration of cyanide higher than said waste stream;
   recovering the cyanide from said eluate by acidification followed by volatilization.

2. A method according to claim 1 wherein said free cyanide is complexed prior to said concentrating step.

3. A method according to claim 1 wherein said free cyanide passes through said ion exchange resin and is recycled for use.

4. A method according to claim 1 wherein said eluting comprises recycling said lime solution through a $Ca(OH)_2$ saturation source and said resin until said resin is substantially stripped of its cyanide load.

5. A method according to claim 4 wherein said recycling continues until the effluent pH increases to about 11.

6. A method according to claim 1 wherein said waste stream contains thiocyanate and further comprising:
   adsorbing said thiocyanide on said resin during said concentrating.

7. A method according to claim 6 wherein said concentrating is achieved by partial loading with respect to metal cyanide complexes.

8. A method according to claim 7 wherein said resin loading is from about 0.5 to about 3 pounds total cyanide per cubic foot resin.

9. A method according to claim 1 wherein said acidification comprises lowering the pH to a level sufficient to dissociate CN from said complexes by contacting said eluate with acid, whereby HCN is formed.

10. A method according to claim 9 wherein said acid is $H_2SO_4$.

11. A method according to claim 9 wherein said HCN is volatilized by heating.

12. A method according to claim 11 wherein said volatilized HCN is neutralized to form cyanide salt.

13. A method of treating waste streams comprising free cyanide and metal cyanide complexes, wherein said metal is selected from the group consisting of Zn, Cu, Cd, Fe, Co, and Ni, said method comprising: concentrating said metal cyanide complexes using weak base ion exchange resin; and eluting the resin with a recycled saturated lime solution to which a thiocyanate compound has been added to form an eluate having a concentration of cyanide higher than said waste stream.

14. A method of treating waste streams comprising thiocyanate compounds and metal cyanide complexes comprising complexes of cyanide with zinc comprising the steps of:
    partially loading weak base ion exchange resin with metal cyanide complexes and thiocyanate; and
    eluting the resin with a recycled saturated lime solution to form an eluate comprising zinc ions.

15. The method of claim 14 wherein said metal cyanide complexes comprise complexes of cyanide with copper and further comprising the steps of:
    acidifying said eluate in the presence of an amount of thiocyanate; and
    heating said acidified eluate to volatilize HCN.

16. The method of claim 14 wherein said metal cyanide complexes further comprise complexes of cyanide with copper and wherein said waste stream comprises thiocyanate and further comprising:
    recovering the cyanide from said eluate by acidification followed by volatilization.

17. In a process for recovering HCN from a dilute complex metal cyanide-containing solution by acidification followed by volatilization, the improvement comprising:
    concentrating said cyanide in the solution to be acidified by passing the solution through a weak base ion exchange resin and eluting said ion exchange resin by contacting said resin with a saturated solution of $Ca(OH)_2$ to produce eluate having a cyanide concentration higher than said dilute solution.

18. The process of claim 17 wherein said acidifying step comprises contacting said eluate with $H_2SO_4$.

19. The process of claim 17 further comprising: separating said volatilized HCN therefrom.

20. The process of claim 17 further comprising recovering said HCN by contacting with an aqueous solution of $Ca(OH)_2$ to form $Ca(CN)_2$.

21. The process of claim 17 wherein said dilute cyanide solution contains less than about 0.5 weight percent cyanide.

22. The process of claim 17 wherein said eluate contains at least about 0.5 weight percent cyanide.

23. The process of claim 17 wherein said eluting comprises recycling an eluant comprising $Ca(OH)_2$ sequentially through a $Ca(OH)_2$ saturation source and said resin until an effluent pH greater than 11 is obtained.

24. The process of claim 17 wherein said solution comprises free cyanide and further comprising complexing said free cyanide prior to said concentrating.

25. A process for eluting a weak anion-exchange resin column comprising:
    (a) contacting the resin with a complex cyanide containing feed solution to form a complex cyanide-loaded resin;
    (b) discontinuing contact of said feed with the resin;
    (c) contacting the complex cyanide-loaded resin with a calcium hydroxide-saturated aqueous solution;
    (d) withdrawing a portion of said solution from the column;
    (e) contacting said withdrawn portion with a solid bed comprising $Ca(OH)_2$ to form a calcium hydroxide-saturated recycled solution;
    (f) contacting said recycle solution with a complex cyanide-loaded resin;
    (g) repeating steps (d) through (f) until the pH of said withdrawn portion is greater than about 11; and
    (h) recovering cyanide from said withdrawn portion by acidification followed by volatilization; and
    (i) flushing the column with a low-cyanide content aqueous solution.

26. The process of claim 25 wherein said feed contains $Zn(CN)_4^{-2}$ and further comprising performing said discontinuing step when the resin is partially loaded.

* * * * *